United States Patent
Uenaka et al.

(10) Patent No.: US 7,440,686 B2
(45) Date of Patent: Oct. 21, 2008

(54) ANTI-SHAKE APPARATUS

(75) Inventors: Yukio Uenaka, Tokyo (JP); Shuzo Seo, Saitama (JP)

(73) Assignee: Hoya Corporation, Tokyo (JP)

( * ) Notice: Subject to any disclaimer, the term of this patent is extended or adjusted under 35 U.S.C. 154(b) by 509 days.

(21) Appl. No.: 11/139,625

(22) Filed: May 31, 2005

(65) Prior Publication Data

US 2005/0265704 A1    Dec. 1, 2005

(30) Foreign Application Priority Data

May 31, 2004   (JP)   ............................ P2004-161201
May 31, 2004   (JP)   ............................ P2004-161523

(51) Int. Cl.
*G03B 17/00* (2006.01)
(52) U.S. Cl. ....................................... 396/55
(58) Field of Classification Search ............ 396/52–55; 348/208.7, 208.8, 208.11
See application file for complete search history.

(56) References Cited

U.S. PATENT DOCUMENTS

| | | | | |
|---|---|---|---|---|
| 5,266,988 | A | 11/1993 | Washisu | 348/208.7 |
| 7,295,770 | B2* | 11/2007 | Uenaka et al. | 396/55 |
| 2003/0067544 | A1 | 4/2003 | Wada | 396/55 |
| 2005/0169619 | A1* | 8/2005 | Uenaka et al. | 396/55 |
| 2005/0196160 | A1* | 9/2005 | Uenaka | 396/55 |
| 2005/0244152 | A1* | 11/2005 | Seo | 396/55 |
| 2005/0265705 | A1* | 12/2005 | Uenaka | 396/55 |

FOREIGN PATENT DOCUMENTS

| | | |
|---|---|---|
| JP | 8-304868 | 11/1996 |
| JP | 2001-117129 | 4/2001 |
| JP | 2002-229090 | 8/2002 |
| JP | 2003-110919 | 4/2003 |

OTHER PUBLICATIONS

U.S. Appl. No. 11/044,010 to Uenaka et al., filed Jan. 28, 2005.
U.S. Appl. No. 11/044,055 to Uenaka et al., filed Jan. 28, 2005.
U.S. Appl. No. 11/044,054 to Uenaka, filed Jan. 28, 2005.
U.S. Appl. No. 11/065,577 to Uenaka, filed Feb. 25, 2005.
U.S. Appl. No. 11/065,354 to Uenaka et al., filed Feb. 25, 2005.

(Continued)

*Primary Examiner*—W. B. Perkey
(74) *Attorney, Agent, or Firm*—Greenblum & Bernstein, P.L.C.

(57) ABSTRACT

An anti-shake apparatus of a photographing-apparatus includes a movable-unit and a fixed-unit. The movable-unit has an imaging device, and is movable in a first-direction perpendicular to an optical axis of the photographing-apparatus, and performs an anti-shake operation by moving in the first-direction. The fixed-unit slidably supports the movable-unit in the first-direction. The movable-unit has first and second hall-elements for detecting a position of the movable-unit in the first-direction as a first location, in order to calculate a detected-position signal. The fixed-unit has first and second magnets for detecting the first location. The detected-position signal is calculated on the basis of an average of outputs of the first and second hall-elements.

33 Claims, 20 Drawing Sheets

OTHER PUBLICATIONS

U.S. Appl. No. 11/073,638 to Uenaka et al., filed Mar. 8, 2005.
U.S. Appl. No. 11/073,604 to Uenaka, filed Mar. 8, 2005.
U.S. Appl. No. 11/071,234 to Uenaka, filed Mar. 4, 2005.
U.S. Appl. No. 11/071,220 to Uenaka et al., filed Mar. 4, 2005.
U.S. Appl. No. 11/071,241 to Uenaka, filed Mar. 4, 2005.
U.S. Appl. No. 11,071,242 to Uenaka, filed Mar. 4, 2005.
U.S. Appl. No. 11/078,367 to Seo, filed Mar. 14, 2005.
U.S. Appl. No. 11/108,868 to Uenaka et al., filed Apr. 19, 2005.
U.S. Appl. No. 11/115,315 to Seo, filed Apr. 27, 2005.
U.S. Appl. No. 11/139,633 to Seo, filed Apr. 27, 2005.
U.S. Appl. No. 11/140,966 to Seo, filed Jun. 1, 2005.
U.S. Appl. No. 11/140,731 to Seo, filed Jun. 1, 2005.
U.S. Appl. No. 11/159,156 to Ogawa et al., filed Jun. 23, 2005.
English language Abstract of JP 2002-229090, Aug. 2002.
English language Abstract of JP 08-304868, Nov. 1996.
English language Abstract of JP 2001-117129, Apr. 2001.
English language Abstract of JP 2003-110919, Aug. 2002.

* cited by examiner

ANTI-SHAKE APPARATUS

BACKGROUND OF THE INVENTION

1. Field of the Invention

The present invention relates to an anti-shake apparatus for a photographing device (apparatus), and in particular to a position-detecting apparatus for a movable unit that includes the imaging device etc., and that can be moved for correcting the hand-shake effect.

2. Description of the Related Art

An anti-shake apparatus for a photographing apparatus is proposed. The anti-shake apparatus corrects for the hand-shake effect by moving a hand-shake correcting lens or an imaging device on a plane that is perpendicular to the optical axis, corresponding to the amount of hand-shake which occurs during imaging.

Japanese unexamined patent publication (KOKAI) No. 2002-229090 discloses an anti-shake apparatus for a photographing apparatus. The anti-shake apparatus performs a moving operation of a movable unit, which includes a hand-shake correcting lens, by using a magnet and a coil, and a position-detecting operation of the movable unit, by using a hall element and a magnet.

However, the magnet and yoke are enlarged on the plane which is perpendicular to the optical axis, because the parts of the magnet and yoke for detecting the position of the movable unit in the first direction extend to the parts of the magnet and yoke for moving the movable unit in the first direction, and the parts of the magnet and yoke for detecting the position of the movable unit in the second direction extend to the parts of the magnet and yoke for moving the movable unit in the second direction, on the plane which is perpendicular to the optical axis.

The first direction is perpendicular to the optical axis, and the second direction is perpendicular to the optical axis and the first direction.

SUMMARY OF THE INVENTION

Therefore, an object of the present invention is to provide an anti-shake apparatus in which the size is not enlarged on the plane which is perpendicular to the optical axis.

According to the present invention, an anti-shake apparatus of a photographing apparatus comprises a movable unit and a fixed unit.

The movable unit has one of an imaging device and a hand-shake correcting lens, and can be moved in first and second directions, and performs an anti-shake operation by moving in the first and second directions.

The first direction is perpendicular to an optical axis of a photographing optical system of the photographing apparatus.

The second direction is perpendicular to the optical axis and the first direction.

The fixed unit slidably supports the movable unit in both the first and second directions.

One of the movable unit and the fixed unit has first and second magnetic-field change-detecting elements which are used for detecting a position of the movable unit in the first direction as a first location, in order to calculate a first detected-position signal, and has third and fourth magnetic-field change-detecting elements which are used for detecting a position of the movable unit in the second direction as a second location, in order to calculate a second detected-position signal.

Another of the movable unit and the fixed unit has first and second magnets which are used for detecting the first location, and has third and fourth magnets which are used for detecting the second location.

The first magnetic-field change-detecting element faces the first magnet in the second direction.

The second magnetic-field change-detecting element faces the second magnet in the second direction.

The third magnetic-field change-detecting element faces the third magnet in the first direction.

The fourth magnetic-field change-detecting element faces the fourth magnet in the first direction.

The first detected-position signal is calculated on the basis of an average value between output values of the first and second magnetic-field change-detecting elements.

The second detected-position signal is calculated on the basis of an average value between output values of the third and fourth magnetic-field change-detecting elements.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
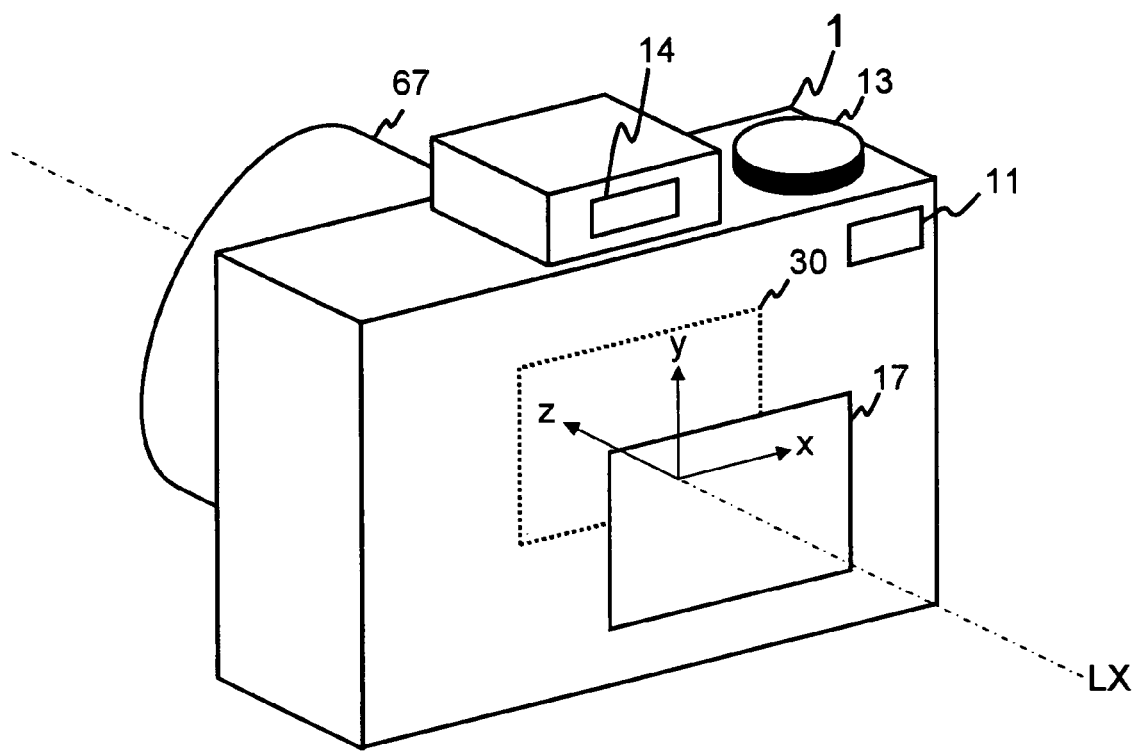
FIG. 1 is a perspective view of a photographing apparatus of the first and second embodiments, viewed from the back side of the photographing apparatus.

The present invention is described below with reference to the embodiment shown in the drawings. In the first and second embodiments, the photographing apparatus 1 is a digital camera. The photographing apparatus 1 has an optical axis LX.

In order to explain the direction in this embodiment, a first direction x, a second direction y, and a third direction z are defined (see FIG. 1). The first direction x is a horizontal direction which is perpendicular to the optical axis LX. The second direction y is a vertical direction which is perpendicular to the optical axis LX and the first direction x. The third direction z is a horizontal direction which is parallel to the optical axis LX and perpendicular to both the first direction x and the second direction y.

Figure 4:
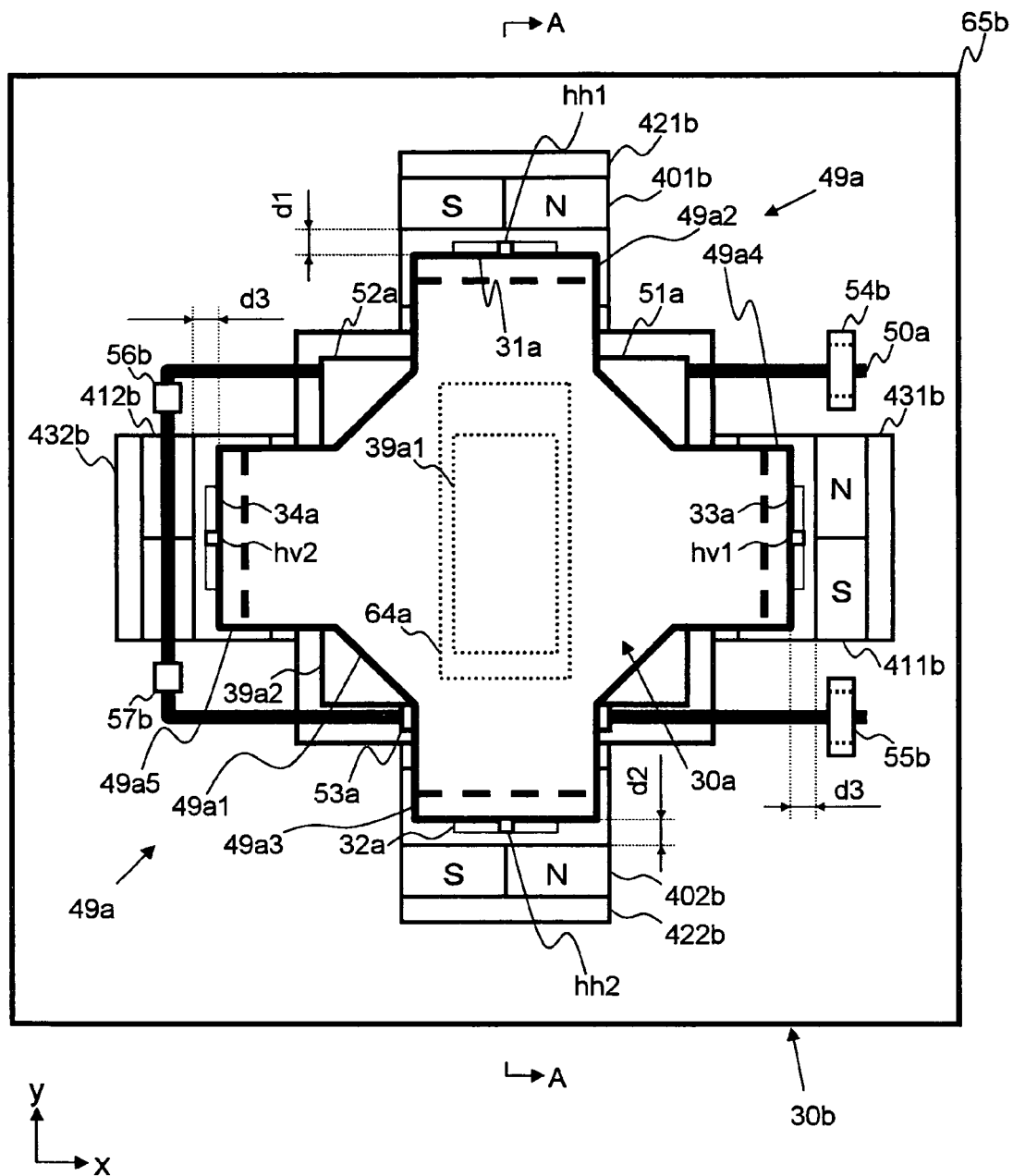
FIG. 4 is a figure showing the construction of the anti-shake unit.
Figure 5:
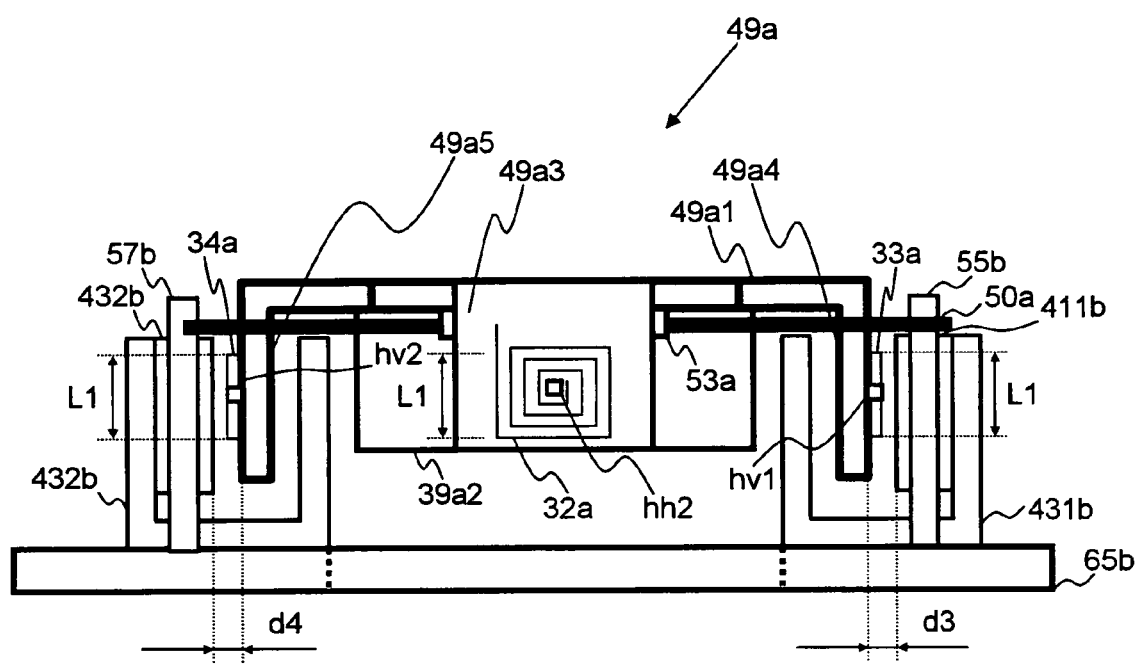
FIG. 5 is a construction diagram of the anti-shake unit, viewed from the second horizontal position-detecting and driving yoke side and viewed from the second direction.
Figure 6:
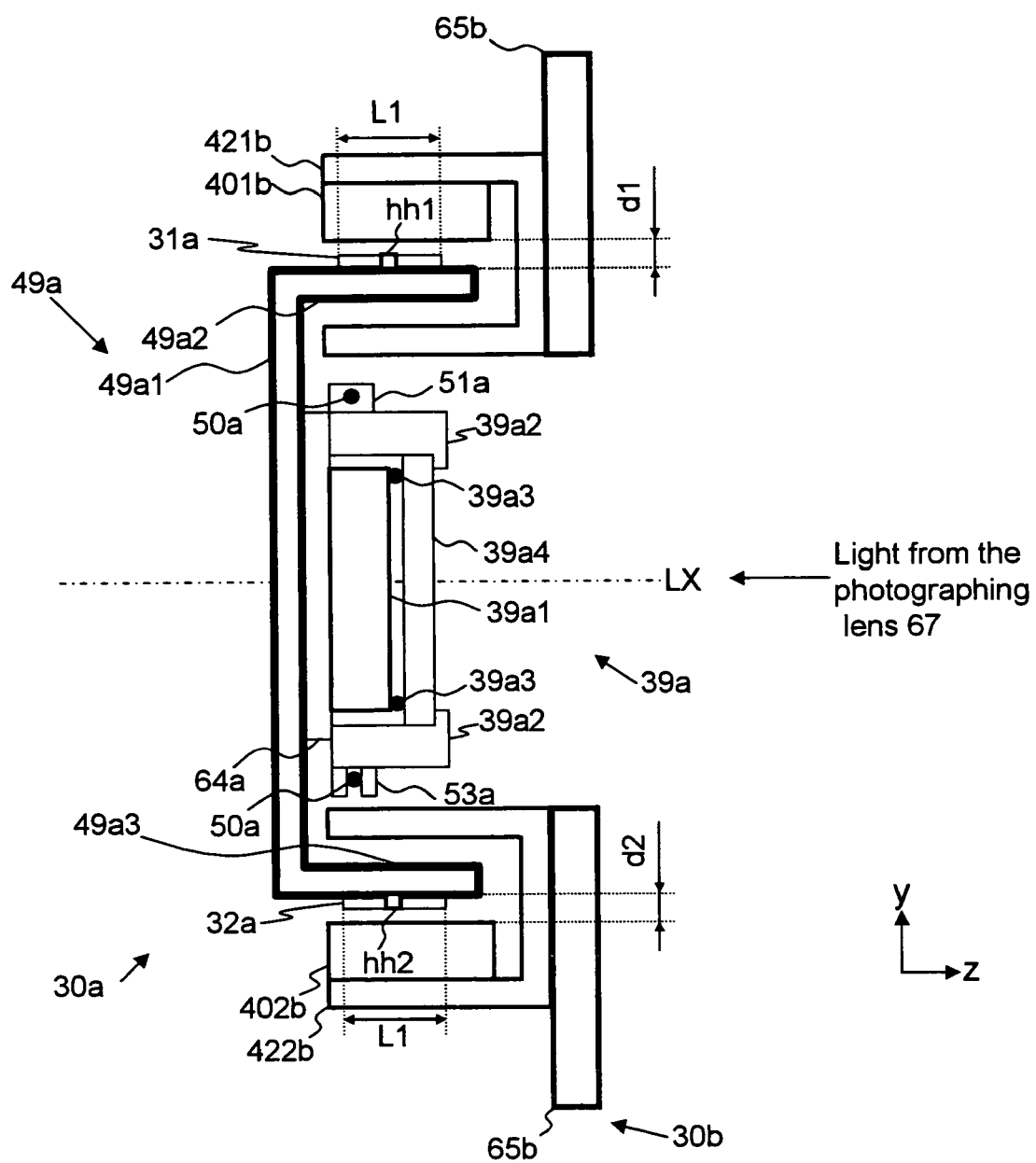
FIG. 6 is a view along line A-A of FIG. 4.

FIG. 5 shows a construction diagram of the anti-shake unit 30, viewed from the second horizontal position-detecting and driving yoke 422b side and viewed from the second direction y. FIG. 6 shows a construction diagram of the section along line A-A of FIG. 4.

Figure 2:
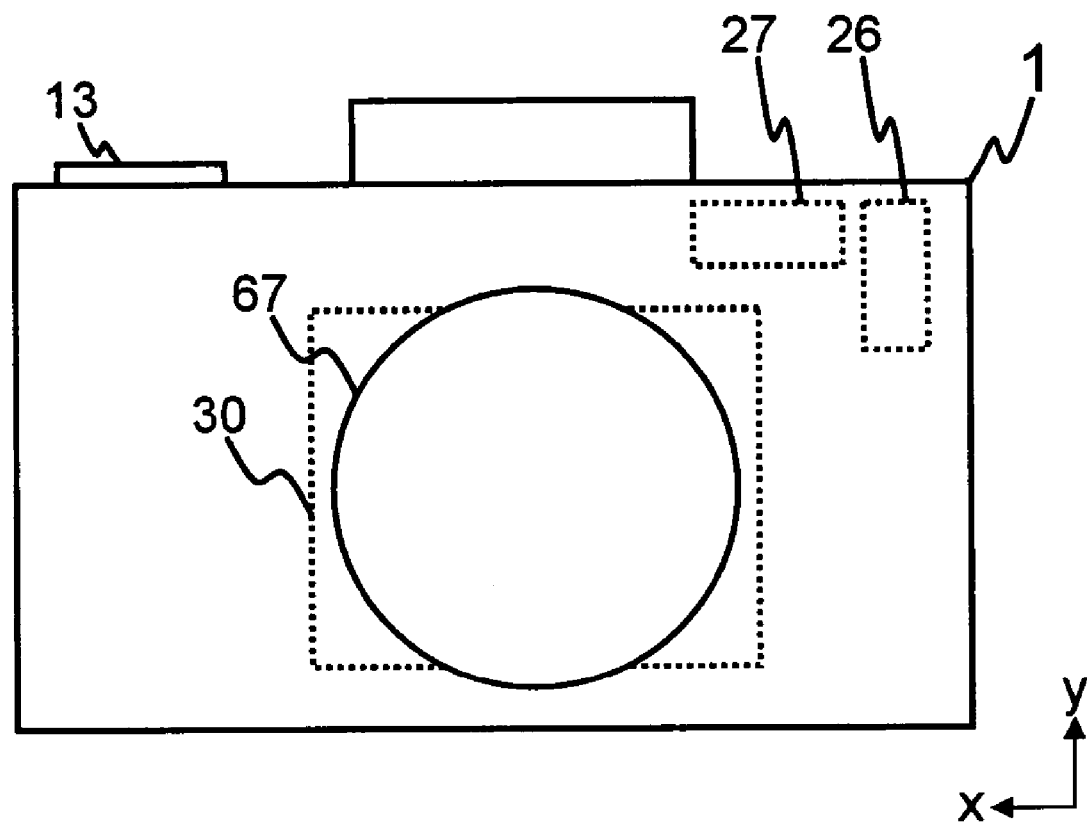
FIG. 2 is a front view of the photographing apparatus.
Figure 3:
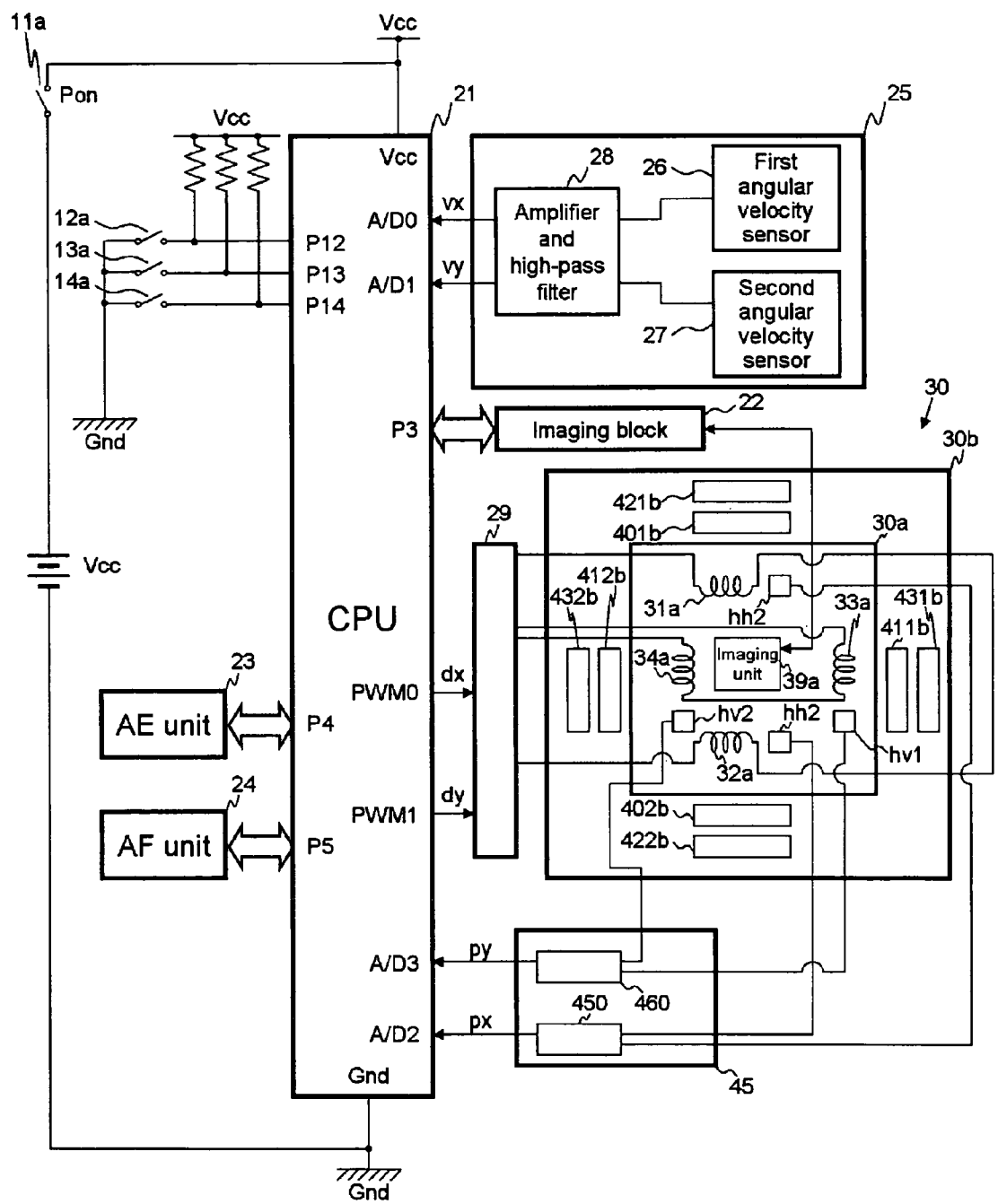
FIG. 3 is a circuit construction diagram of the photographing apparatus.

The imaging part of the photographing apparatus 1 comprises a Pon button 11, a Pon switch 11a, a photometric switch 12a, a release button 13, a release switch 13a, an indicating unit 17 such as an LCD monitor etc., a CPU 21, an imaging block 22, an AE (automatic exposure) unit 23, an AF (automatic focusing) unit 24, an imaging unit 39a in the anti-shake unit 30, and a photographing optical system 67 (see FIGS. 1, 2, and 3).

Whether the Pon switch 11a is in the on state or the off state, is determined by a state of the Pon button 11, so that the on/off states of the main power supply of the photographing apparatus 1 are changed corresponding to the on/off states of the Pon switch 11a.

The photographic subject image is taken as an optical image through the photographing optical system 67 by the imaging block 22, which drives the imaging unit 39a, so that the image, which is taken, is indicated on the indicating unit 17. The photographic subject image can be optically observed by the optical finder (not depicted).

When the release button 13 is half pushed by the operator, the photometric switch 12a changes to the on state, so that the photometric operation, the AF sensing operation, and the focusing operation are performed.

When the release button 13 is fully pushed by the operator, the release switch 13a changes to the on state, so that the imaging operation is performed, and the image, which is taken, is stored.

The CPU 21 is a control apparatus, which controls each part of the photographing apparatus 1 regarding the imaging operation, and controls each part of the photographing apparatus 1 regarding the anti-shake operation. The anti-shake operation controls the movement of the movable unit 30a and controls detecting the position of the movable unit 30a.

The CPU 21 stores the value of a parameter IS which is used for judging whether the photographing apparatus 1 is in the anti-shake mode.

The imaging block 22 drives the imaging unit 39a.

The AE unit 23 performs the photometric operation for the photographic subject, calculates the photometric values, and calculates the aperture value and the time length of the exposure time, which is needed for imaging, corresponding to the photometric values. The AF unit 24 performs the AF sensing operation, and performs the focusing operation, which is needed for the imaging, corresponding to the result of the AF sensing operation. In the focusing operation, the position of the photographing optical system 67 is moved in the optical axis LX direction.

The anti-shaking part of the photographing apparatus 1 comprises an anti-shake button 14, an anti-shake switch 14a, a CPU 21, an angular velocity detecting unit 25, a driver circuit 29, an anti-shake unit 30, a hall-element signal-processing unit 45, and the photographing optical system 67.

When the anti-shake button 14 is fully pushed by the operator, the anti-shake switch 14a changes to the on state, so that the anti-shake operation is performed where the angular velocity detecting unit 25 and the anti-shake unit 30 are driven, at every predetermined time interval, independently of the other operations which include the photometric operation etc. When the anti-shake switch 14a is in the on state, in other words in the anti-shake mode, the parameter IS is set to 1 (IS=1). When the anti-shake switch 14a is not in the on state, in other words in the non anti-shake mode, the parameter IS is set to 0 (IS=0). In the first embodiment, the predetermined time interval is 1 ms.

The various output commands corresponding to the input signals of these switches are controlled by the CPU 21.

The information regarding whether the photometric switch 12a is in the on state or in the off state, is input to port P12 of the CPU 21 as a 1-bit digital signal. The information regarding whether the release switch 13a is in the on state or in the off state, is input to port P13 of the CPU 21 as a 1-bit digital signal. The information regarding whether the anti-shake switch 14a is in the on state or in the off state, is input to port P14 of the CPU 21 as a 1-bit digital signal.

The imaging block 22 is connected to port P3 of the CPU 21 for inputting and outputting signals. The AE unit 23 is connected to port P4 of the CPU 21 for inputting and outputting signals. The AF unit 24 is connected to port P5 of the CPU 21 for inputting and outputting signals.

Next, the details of the input and output relationship with the CPU 21 for the angular velocity unit 25, the driver circuit 29, the anti-shake unit 30, and the hall-element signal-processing unit 45, are explained.

The angular velocity unit 25 has a first angular velocity sensor 26, a second angular velocity sensor 27, and a combined amplifier and high-pass filter circuit 28. The first angular velocity sensor 26 detects the velocity-component in the first direction x of the angular velocity of the photographing apparatus 1, at every predetermined time interval (1 ms). The second angular velocity sensor 27 detects the velocity-component in the second direction y of the angular velocity of the photographing apparatus 1, at every predetermined time interval (1 ms).

The combined amplifier and high-pass filter circuit 28 amplifies the signal regarding the first direction x of the angular velocity (the velocity-component in the first direction x of the angular velocity), reduces a null voltage and a panning of the first angular velocity sensor 26, and outputs the analogue signal to the A/D converter A/D 0 of the CPU 21 as a first angular velocity vx.

The combined amplifier and high-pass filter circuit 28 amplifies the signal regarding the second direction y of the angular velocity (the velocity-component in the second direction y of the angular velocity), reduces a null voltage and a panning of the second angular velocity sensor 27, and outputs the analogue signal to the A/D converter A/D 1 of the CPU 21 as a second angular velocity vy.

The CPU 21 converts the first angular velocity vx which is input to the A/D converter A/D 0 and the second angular velocity vy which is input to the A/D converter A/D 1 to digital signals (A/D converting operation), and calculates the hand-shake quantity, which occurs in the predetermined time (1 ms), on the basis of the converted digital signals and the converting coefficient, where focal distance is considered. Accordingly, the CPU 21 and the angular velocity detecting unit 25 have a function which calculates the hand-shake quantity.

The CPU 21 calculates the position S of the imaging unit 39a (the movable unit 30a), which should be moved to, corresponding to the hand-shake quantity which is calculated, for the first direction x and the second direction y.

The location in the first direction x of the position S is defined as sx, and the location in the second direction y of the position S is defined as sy. The movement of the movable unit 30a, which includes the imaging unit 39a, is performed by using electromagnetic force and is described later. The driving force D, which drives the driver circuit 29 in order to move the movable unit 30a to the position S, has a first PWM duty dx as the driving-force component in the first direction x, and a second PWM duty dy as the driving-force component in the second direction y.

The anti-shake unit 30 is an apparatus which corrects the hand-shake effect, by moving the imaging unit 39a to the position S, by canceling lag of the photographic subject image on the imaging surface of the imaging device 39a1, and by stabilizing the photographing subject image that reaches the imaging surface of the imaging device 39a1.

The anti-shake unit 30 has a movable unit 30a, which includes the imaging unit 39a, and a fixed unit 30b. Or, the anti-shake unit 30 is composed of a driving part which moves the movable unit 30a by electro-magnetic force to the position S, and a position-detecting part which detects the position of the movable unit 30a (a detected-position P).

The size and the direction of the electromagnetic force are determined by the size and the direction of the current which flows in the coil, and the size and the direction of the magnetic-field of the magnet.

The driving of the movable unit 30a of the anti-shake unit 30, is performed by the electro-magnetic force generated by the first and second horizontal driving coils 31a and 32a, the first and second vertical driving coils 33a and 34a, the first and second horizontal position-detecting and driving magnets 401b and 402b, and the first and second vertical position-detecting and driving magnets 411b and 412b, through the driver circuit 29 which has the first PWM duty dx input from the PWM 0 of the CPU 21 and has the second PWM duty dy input from the PWM 1 of the CPU 21.

The detected-position P of the movable unit 30a, either before moving or after moving, which is moved by driving the driver circuit 29, is detected by the hall element unit 44a and the hall-element signal-processing unit 45.

Information of a first location in the first direction x for the detected-position P, in other words a first detected-position signal px is input to the A/D converter A/D 2 of the CPU 21. The first detected-position signal px is an analogue signal, and is converted to a digital signal through the A/D converter A/D 2 (A/D converting operation). The first location in the first direction x for the detected-position P, after the A/D converting operation, is defined as pdx, corresponding to the first detected-position signal px.

Information of a second location in the second direction y for the detected-position P, in other words a second detected-position signal py is input to the A/D converter A/D 3 of the CPU 21. The second detected-position signal py is an analogue signal, and is converted to a digital signal through the A/D converter A/D 3 (A/D converting operation). The second location in the second direction y for the detected-position P, after the A/D converting operation, is defined as pdy, corresponding to the second detected-position signal py.

The PID (Proportional Integral Differential) control is performed on the basis of the data for the detected-position P (pdx, pdy) and the data for the position S (sx, sy) which should be moved to.

The movable unit 30a has first and second driving coils 31a and 32a, first and second vertical driving coils 33a and 34a, an imaging unit 39a, a hall element unit 44a, a movable circuit board 49a, a shaft for movement 50a, a first bearing unit for horizontal movement 51a, a second bearing unit for horizontal movement 52a, a third bearing unit for horizontal movement 53a, and a plate 64a (see FIGS. 4 to 6).

The fixed unit 30b has first and second horizontal position-detecting and driving magnets 401b and 402b, first and second vertical position-detecting and driving magnets 411b and 412b, first and second horizontal position-detecting and driving yokes 421b and 422b, first and second vertical position-detecting and driving yokes 431b and 432b, a first bearing unit for vertical movement 54b, a second bearing unit for vertical movement 55b, a third bearing unit for vertical movement 56b, a fourth bearing unit for vertical movement 57b, and a base board 65b.

Next, the way in which the fixed unit 30b slidably supports the movable unit 30a in both the first direction x and the second direction y, is explained.

The shaft for movement 50a of the movable unit 30a has a channel shape when viewed from the third direction z. The first, second, third, and fourth bearing units for vertical movement 54b, 55b, 56b, and 57b are attached to the base board 65b of the fixed unit 30b. The shaft for movement 50a is slidably supported in the vertical direction (the second direction y), by the first, second, third, and fourth bearing units for vertical movement 54b, 55b, 56b, and 57b.

The first and second bearing units for vertical movement 54b and 55b have slots which extend in the second direction y.

Therefore, the movable unit 30a can move relative to the fixed unit 30b, in the vertical direction (the second direction y).

The shaft for movement 50a is slidably supported in the horizontal direction (the first direction x), by the first, second, and third bearing units for horizontal movement 51a, 52a, and 53a of the movable unit 30a. Therefore, the movable unit 30a, except for the shaft for movement 50a, can move relative to the fixed unit 30b and the shaft for movement 50a, in the horizontal direction (the first direction x).

When the center area of the imaging device 39a1 is located on the optical axis LX of the photographing optical system 67, the location relation between the movable unit 30a and the fixed unit 30b is set up so that the movable unit 30a is located at the center of its movement range in both the first direction x and the second direction y, in order to utilize the full size of the imaging range of the imaging device 39a1.

A rectangle shape, which forms the imaging surface (the valid pixel area) of the imaging device 39a1, has two diagonal lines. In the first embodiment, the center of the imaging device 39a1 is the crossing point of these two diagonal lines.

In the first embodiment, the center of the imaging device 39a1 agrees with the center of gravity of the rectangle shape of the valid pixel area. Accordingly, when the movable unit 30a is located at the center of its movement range, the center of gravity of the rectangle shape of the valid pixel area is located on the optical axis LX of the photographing optical system 67.

The imaging unit 39a, the plate 64a, and a first movable circuit board 49a1 of the movable circuit board 49a are attached, in this order along the optical axis LX direction, viewed from the side of the photographing optical system 67. The imaging unit 39a has an imaging device 39a1 (such as a CCD or a COMS etc.), a stage 39a2, a holding unit 39a3, and an optical low-pass filter 39a4. The stage 39a2 and the plate 64a hold and urge the imaging device 39a1, the holding unit 39a3, and the optical low-pass filter 39a4 in the optical axis LX direction.

The first, second, and third bearing units for horizontal movement 51a, 52a, and 53a are attached to the stage 39a2. The imaging device 39a1 is attached to the plate 64a, so that positioning of the imaging device 39a1 is performed where the imaging device 39a1 is perpendicular to the optical axis LX of the photographing optical system 67. In the case where the plate 64a is made of a metallic material, the plate 64a has the effect of radiating heat from the imaging device 39a1, by contacting the imaging device 39a1.

The movable circuit board 49a is a multi layered circuit board and has first, second, third, fourth, and fifth movable circuit boards 49a1, 49a2, 49a3, 49a4, and 49a5. The second, third, fourth, and fifth movable circuit boards 49a2, 49a3, 49a4, and 49a5 are perpendicular to the first movable circuit board 49a1.

The first movable circuit board 49a1 is on a plane which is perpendicular to the third direction z. The second movable circuit board 49a2 is on a plane which is perpendicular to the second direction y. The third movable circuit board 49a3 is on a plane which is perpendicular to the second direction y. The fourth movable circuit board 49a4 is on a plane which is perpendicular to the first direction x. The fifth movable circuit board 49a5 is on a plane which is perpendicular to the first direction x.

The imaging device 39a1 is between the second and third movable circuit boards 49a2 and 49a3 in the second direction y, and is between the fourth and fifth movable circuit boards 49a4 and 49a5 in the first direction x.

The first horizontal driving coil 31a and a first horizontal hall element hh1 of the hall element unit 44a are attached on the opposite side of the second movable circuit board 49a2 to the imaging device 39a1.

The first horizontal driving coil 31a forms a seat and a spiral shape coil pattern. The coil pattern of the first horizontal driving coil 31a has a line segment which is parallel to the third direction z, where the movable unit 30a which includes the first horizontal driving coil 31a, is moved in the first direction x, by the first horizontal electro-magnetic force. The line segment which is parallel to the third direction z, has an effective length L1.

The first horizontal electromagnetic force occurs on the basis of the current direction of the first horizontal driving coil 31a and the magnetic-field direction of the first horizontal position-detecting and driving magnet 401b.

The second horizontal driving coil 32a and a second horizontal hall element hh2 of the hall element unit 44a are attached on the opposite side of the third movable circuit board 49a3 to the imaging device 39a1.

The second horizontal driving coil 32a forms a seat and a spiral shape coil pattern. The coil pattern of the second horizontal driving coil 32a has a line segment which is parallel to the third direction z, where the movable unit 30a which includes the second horizontal driving coil 32a, is moved in the first direction x, by the second horizontal electromagnetic force. The line segment which is parallel to the third direction z, has the effective length L1.

The second horizontal electromagnetic force occurs on the basis of the current direction of the second horizontal driving coil 32a and the magnetic-field direction of the second horizontal position-detecting and driving magnet 402b.

The first vertical driving coil 33a and a first vertical hall element hv1 of the hall element unit 44a are attached on the opposite side of the fourth movable circuit board 49a4 to the imaging device 39a1.

The first vertical driving coil 33a forms a seat and a spiral shape coil pattern. The coil pattern of the first vertical driving coil 33a has a line segment which is parallel to the third direction z, where the movable unit 30a which includes the first vertical driving coil 33a, is moved in the second direction y, by the first vertical electro-magnetic force. The line segment which is parallel to the third direction z, has the effective length L1.

The first vertical electro-magnetic force occurs on the basis of the current direction of the first vertical driving coil 33a and the magnetic-field direction of the first vertical position-detecting and driving magnet 411b.

The second vertical driving coil 34a and a second vertical hall element hv2 of the hall element unit 44a are attached on the opposite side of the fifth movable circuit board 49a5 to the imaging device 39a1.

The second vertical driving coil 34a forms a seat and a spiral shape coil pattern. The coil pattern of the second vertical driving coil 34a has a line segment which is parallel to the third direction z, where the movable unit 30a which includes the second vertical driving coil 33a, is moved in the second direction y, by the second vertical electro-magnetic force. The line segment which is parallel to the third direction z, has the effective length L1.

The second vertical electro-magnetic force occurs on the basis of the current direction of the second vertical driving coil 34a and the magnetic-field direction of the second vertical position-detecting and driving magnet 412b.

The details of the first and second horizontal hall elements hh1 and hh2 and the first and second vertical hall element hv1 and hv2 are described later.

Because the first and second horizontal driving coils 31a and 32a are seat and spiral shape coil patterns, the thicknesses of the first and second horizontal driving coils 31a and 32a, in the second direction y, can be thinned down in the second direction y.

Similarly, because the first and second vertical driving coils 33a and 34a are seat and spiral shape coil patterns, the thicknesses of the first and second vertical driving coils 33a and 34a, in the first direction x, can be thinned down in the first direction x.

Therefore, even if the first horizontal driving coil 31a consists of some seat coils which are layered in the second direction y (in order to raise the first horizontal electro-magnetic force), the thickness of the first horizontal driving coil 31a is not increased in the second direction y.

Similarly, even if the second horizontal driving coil 32a consists of some seat coils which are layered in the second direction y (in order to raise the second horizontal electro-magnetic force), the thickness of the second horizontal driving coil 32a is not increased in the second direction y.

Similarly, even if the first vertical driving coil 33a consists of some seat coils which are layered in the first direction x (in order to raise the first vertical electro-magnetic force), the thickness of the first vertical driving coil 33a is not increased in the first direction x.

Similarly, even if the second vertical driving coil 34a consists of some seat coils which are layered in the first direction x (in order to raise the second vertical electro-magnetic force), the thickness of the second vertical driving coil 34a is not increased in the first direction x.

Further, it is possible to reduce the size of the anti-shake apparatus 30, by reducing the distance between the second movable circuit board 49a2 and the first horizontal position-detecting and driving magnet 401b in the second direction y, the distance between the third movable circuit board 49a3 and the second horizontal position-detecting and driving magnet 402b in the second direction y, the distance between the fourth movable circuit board 49a4 and the first vertical position-detecting and driving magnet 411b in the first direction x, and the distance between the fifth movable circuit board 49a5 and the second vertical position-detecting and driving magnet 412b in the first direction x, in comparison with when the first and second horizontal driving coils 31a and 32a and the first and second vertical driving coils 33a and 34a do not form seat and spiral shape coil patterns.

Figure 7:
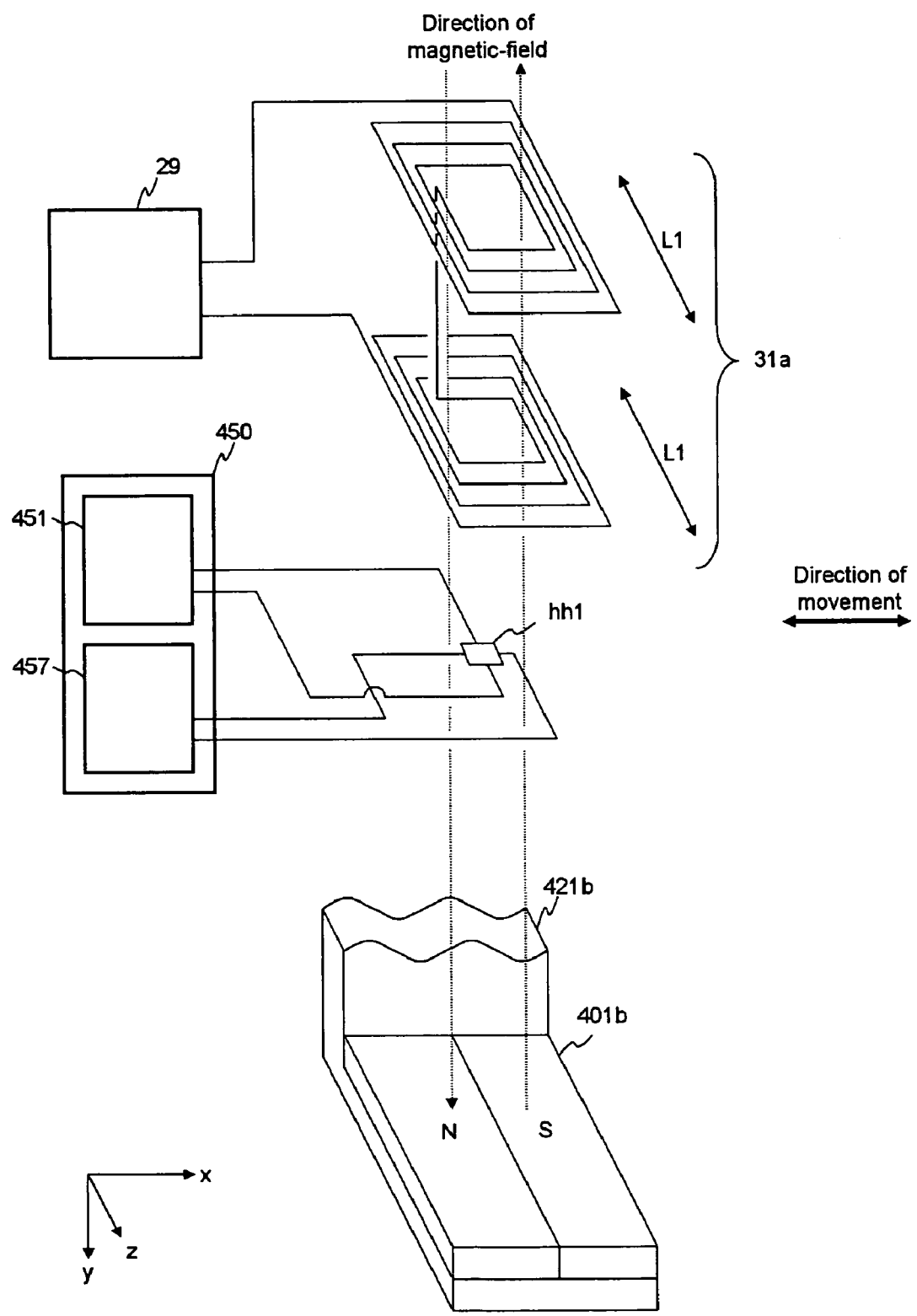
FIG. 7 is a construction figure of the first horizontal driving coil and first horizontal hall element.

In the first embodiment, the first horizontal driving coil 31a (which has two seat coils layered in the second direction y) and the first horizontal hall element hh1, are layered in the second direction y (see FIG. 7).

Similarly, the second horizontal driving coil 32a (which has two seat coils layered in the second direction y) and the second horizontal hall element hh2, are layered in the second direction y.

Similarly, the first vertical driving coil 33a (which has two seat coils layered in the first direction x) and the first vertical hall element hv1, are layered in the first direction x.

Similarly, the second vertical driving coil 34a (which has two seat coils layered in the first direction x) and the second vertical hall element hv2, are layered in the first direction x.

However, the number of seat coils of the first and second horizontal driving coils 31a and 32a and the first and second vertical driving coils 33a and 34a, which are layered, does not have to be two, so that the first and second horizontal driving coils 31a and 32a and the first and second vertical driving coils 33a and 34a are multi-layered seat coils.

The first and second horizontal driving coils 31a and 32a and the first and second vertical driving coils 33a and 34a are connected with the driver circuit 29 which drives the first and second horizontal driving coils 31a and 32a and the first and second vertical driving coils 33a and 34a through the flexible circuit board (not depicted). The first PWM duty dx is input to the driver circuit 29 from the PWM 0 of the CPU 21, and the second PWM duty dy is input to the driver circuit 29 from the PWM 1 of the CPU 21. The driver circuit 29 supplies power to the first and second horizontal driving coils 31a and 32a corresponding to the value of the first PWM duty dx, and to the first and second vertical driving coils 33a and 34a corresponding to the value of the second PWM duty dy, to drive the movable unit 30a.

The first and second horizontal driving coils 31a and 32a are connected in series. The first and second vertical driving coils 33a and 34a are connected in series.

The first horizontal position-detecting and driving magnet 401b is attached to the fixed unit 30b, where the first horizontal position-detecting and driving magnet 401b faces the first horizontal driving coil 31a and the first horizontal hall element hh1 in the second direction y. In other words, the first horizontal position-detecting and driving magnet 401b and the first horizontal driving coil 31a are arranged in the second direction y, so that the first horizontal position-detecting and driving magnet 401b and the first horizontal hall element hh1 are arranged in the second direction y.

The second horizontal position-detecting and driving magnet 402b is attached to the fixed unit 30b, where the second horizontal position-detecting and driving magnet 402b faces the second horizontal driving coil 32a and the second horizontal hall element hh2 in the second direction y. In other words, the second horizontal position-detecting and driving magnet 402b and the second horizontal driving coil 32a are arranged in the second direction y, so that the second horizontal position-detecting and driving magnet 402b and the second horizontal hall element hh2 are arranged in the second direction y.

The first horizontal position-detecting and driving magnet 401b is attached to a plane which is perpendicular to the second direction y, under the condition where the N pole and S pole are arranged in the first direction x.

The second horizontal position-detecting and driving magnet 402b is attached to a plane which is perpendicular to the second direction y, under the condition where the N pole and S pole are arranged in the first direction x.

The movable unit 30a is between the first and second horizontal position-detecting and driving magnets 401b and 402b in the second direction y.

The first vertical position-detecting and driving magnet 411b is attached to the fixed unit 30b, where the first vertical position-detecting and driving magnet 411b faces the first vertical driving coil 33a and the first vertical hall element hv1 in the first direction x. In other words, the first vertical position-detecting and driving magnet 411b and the first vertical driving coil 33a are arranged in the first direction x, so that the first vertical position-detecting and driving magnet 411b and the first vertical hall element hv1 are arranged in the first direction x.

The second vertical position-detecting and driving magnet 412b is attached to the fixed unit 30b, where the second vertical position-detecting and driving magnet 412b faces the second vertical driving coil 34a and the second vertical hall element hv2 in the first direction x. In other words, the second vertical position-detecting and driving magnet 412b and the second vertical driving coil 34a are arranged in the first direction x, so that the second vertical position-detecting and driving magnet 412b and the second vertical hall element hv2 are arranged in the first direction x.

The first vertical position-detecting and driving magnet 411b is attached to a plane which is perpendicular to the first direction x, under the condition where the N pole and S pole are arranged in the second direction y.

The second vertical position-detecting and driving magnet 412b is attached to a plane which is perpendicular to the first direction x, under the condition where the N pole and S pole are arranged in the second direction y.

The movable unit 30a is between the first and second vertical position-detecting and driving magnets 411b and 412b in the first direction x.

The first horizontal position-detecting and driving magnet 401b is attached to the first horizontal position-detecting and driving yoke 421b. The first horizontal position-detecting and driving yoke 421b is attached to the base board 65b of the fixed unit 30b, on the side of the movable unit 30a, in the third direction Z.

The length of the first horizontal position-detecting and driving magnet 401b in the third direction z, is longer in comparison with the effective length L1 of the first horizontal driving coil 31a.

The second horizontal position-detecting and driving magnet 402b is attached to the second horizontal position-detecting and driving yoke 422b. The second horizontal position-detecting and driving yoke 422b is attached to the base board 65b of the fixed unit 30b, on the side of the movable unit 30a, in the third direction z.

The length of the second horizontal position-detecting and driving magnet 402b in the third direction z, is longer in comparison with the effective length L1 of the second horizontal driving coil 32a.

The first vertical position-detecting and driving magnet 411b is attached to the first vertical position-detecting and driving yoke 431b. The first vertical position-detecting and driving yoke 431b is attached to the base board 65b of the fixed unit 30b, on the side of the movable unit 30a, in the third direction z.

The length of the first vertical position-detecting and driving magnet 411b in the third direction z, is longer in comparison with the effective length L1 of the first vertical driving coil 33a.

The second vertical position-detecting and driving magnet 412b is attached to the second vertical position-detecting and driving yoke 432b. The second vertical position-detecting and driving yoke 432b is attached to the base board 65b of the fixed unit 30b, on the side of the movable unit 30a, in the third direction z.

The length of the second vertical position-detecting and driving magnet 412b in the third direction z, is longer in comparison with the effective length L1 of the second vertical driving coil 34a.

The first horizontal position-detecting and driving yoke 421b is made of a soft magnetic material, and forms a square-u-shape channel when viewed from the first direction x. The first horizontal position-detecting and driving magnet 401b, the first horizontal driving coil 31a, and the first horizontal hall element hh1 are inside the channel of the first horizontal position-detecting and driving yoke 421b, in the second direction y.

The side of the first horizontal position-detecting and driving yoke 421b, which contacts the first horizontal position-detecting and driving magnet 401b, prevents the magnetic-field of the first horizontal position-detecting and driving magnet 401b from leaking to the surroundings.

The other side of the first horizontal position-detecting and driving yoke 421b (which faces the first horizontal position-detecting and driving magnet 401b, the first horizontal driving coil 31a, and the second movable circuit board 49a2) raises the magnetic-flux density between the first horizontal position-detecting and driving magnet 401b and the first horizontal driving coil 31a, and between the first horizontal position-detecting and driving magnet 401b and the first horizontal hall element hh1.

The second horizontal position-detecting and driving yoke 422b is made of a soft magnetic material, and forms a square-u-shape channel when viewed from the first direction x. The second horizontal position-detecting and driving magnet 402b, the second horizontal driving coil 32a, and the second horizontal hall element hh2 are inside the channel of the second horizontal position-detecting and driving yoke 422b, in the second direction y.

The side of the second horizontal position-detecting and driving yoke 422b, which contacts the second horizontal position-detecting and driving magnet 402b, prevents the magnetic-field of the second horizontal position-detecting and driving magnet 402b from leaking to the surroundings.

The other side of the second horizontal position-detecting and driving yoke 422b (which faces the second horizontal position-detecting and driving magnet 402b, the second horizontal driving coil 32a, and the third movable circuit board 49a3) raises the magnetic-flux density between the second horizontal position-detecting and driving magnet 402b and the second horizontal driving coil 32a, and between the second horizontal position-detecting and driving magnet 402b and the second horizontal hall element hh2.

The first vertical position-detecting and driving yoke 431b is made of a soft magnetic material, and forms a square-u-shape channel when viewed from the second direction y. The first vertical position-detecting and driving magnet 411b, the first vertical driving coil 33a, and the first vertical hall element hv1 are inside the channel of the first vertical position-detecting and driving yoke 431b, in the first direction x.

The side of the first vertical position-detecting and driving yoke 431b, which contacts the first vertical position-detecting and driving magnet 411b, prevents the magnetic-field of the first vertical position-detecting and driving magnet 411b from leaking to the surroundings.

The other side of the first vertical position-detecting and driving yoke 431b (which faces the first vertical position-detecting and driving magnet 411b, the first vertical driving coil 33a, and the fourth movable circuit board 49a4) raises the magnetic-flux density between the first vertical position-detecting and driving magnet 411b and the first vertical driving coil 33a, and between the first vertical position-detecting and driving magnet 411b and the first vertical hall element hv1.

The second vertical position-detecting and driving yoke 432b is made of a soft magnetic material, and forms a square-u-shape channel when viewed from the second direction y. The second vertical position-detecting and driving magnet 412b, the second vertical driving coil 34a, and the second vertical hall element hv2 are inside the channel of the second vertical position-detecting and driving yoke 432b, in the first direction x.

The side of the second vertical position-detecting and driving yoke 432b, which contacts the second vertical position-detecting and driving magnet 412b, prevents the magnetic-field of the second vertical position-detecting and driving magnet 412b from leaking to the surroundings.

The other side of the second vertical position-detecting and driving yoke 432b (which faces the second vertical position-detecting and driving magnet 412b, the second vertical driving coil 34a, and the fifth movable circuit board 49a5) raises the magnetic-flux density between the second vertical position-detecting and driving magnet 412b and the second vertical driving coil 34a, and between the second vertical position-detecting and driving magnet 412b and the second vertical hall element hv2.

The hall element unit 44a is a one-axis hall element which has four hall elements that are magnetoelectric converting elements (magnetic-field change-detecting elements) using the Hall Effect. The hall element unit 44a detects the first detected-position signal px which is used for specifying the first location in the first direction x for the present position P of the movable unit 30a, and the second detected-position signal py which is used for specifying the second location in the second direction y for the present position P of the movable unit 30a.

Two of the four hall elements are first and second horizontal hall elements hh1 and hh2 for detecting the first location in the first direction x of the movable unit 30a, so that the others are first and second vertical hall elements hv1 and hv2 for detecting the second location in the second direction y of the movable unit 30a (see FIG. 4).

The first horizontal hall element hh1 is attached to the second movable circuit board 49a2 of the movable unit 30a, under the condition where the first horizontal hall element hh1 faces the first horizontal position-detecting and driving magnet 401b of the fixed unit 30b, in the second direction y.

The second horizontal hall element hh2 is attached to the third movable circuit board 49a3 of the movable unit 30a, under the condition where the second horizontal hall element hh2 faces the second horizontal position-detecting and driving magnet 402b of the fixed unit 30b, in the second direction y.

The first vertical hall element hv1 is attached to the fourth movable circuit board 49a4 of the movable unit 30a, under the condition where the first vertical hall element hv2 faces the first vertical position-detecting and driving magnet 411b of the fixed unit 30b, in the first direction x.

The second vertical hall element hv2 is attached to the fifth movable circuit board 49a5 of the movable unit 30a, under the condition where the second vertical hall element hv2 faces the second vertical position-detecting and driving magnet 412b of the fixed unit 30b, in the first direction x.

The first horizontal hall element hh1 is arranged inside the spiral shape of the winding of the first horizontal driving coil 31a. The lengths of the first horizontal position-detecting and driving magnet 401b and the first horizontal position-detecting and driving yoke 421b in the first direction x, are determined by the length of the first horizontal driving coil 31a in the first direction x and the movement range of the first horizontal driving coil 31a in the first direction x, and are not determined by the length of both the first horizontal driving coil 31a and first horizontal hall element hh1 in the first direction x, nor the movement range of both the first horizontal driving coil 31a and the first horizontal hall element hh1 in the first direction x.

Therefore, the lengths of the first horizontal position-detecting and driving magnet 401b and the first horizontal position-detecting and driving yoke 421b can be shortened in the first direction x, so that the anti-shake apparatus 30 can be downsized, in comparison with when the first horizontal hall element hh1 is arranged outside the first horizontal driving coil 31a in the first direction x.

Further, it is desirable that the first horizontal hall element hh1 is arranged midway along an outer circumference of the spiral shape of the winding of the first horizontal driving coil 31a in the first direction x.

In this case where the center of the movement range of the movable unit 30a in the first direction x and the center of the position detecting range of the first horizontal hall element hh1 can agree, the full movement range of the movable unit 30a in the first direction x and the full position detecting range of the first horizontal hall element hh1 can be utilized.

Similarly, the second horizontal hall element hh2 is arranged inside the spiral shape of the winding of the second horizontal driving coil 32a.

Therefore, the lengths of the second horizontal position-detecting and driving magnet 402b and the second horizontal position-detecting and driving yoke 422b can be shortened in the first direction x, so that the anti-shake apparatus 30 can be downsized, in comparison with when the second horizontal hall element hh2 is arranged outside the second horizontal driving coil 32a in the first direction x.

Further, it is desirable that the second horizontal hall element hh2 is arranged midway along an outer circumference of the spiral shape of the winding of the second horizontal driving coil 32a in the first direction x.

In this case, the center of the movement range of the movable unit 30a in the first direction x and the center of the position detecting range of the second horizontal hall element hh2 can agree, so that the movement range of the movable unit 30a in the first direction x and the position detecting range of the second horizontal hall element hh2 can be utilized.

Similarly, the first vertical hall element hv1 is arranged inside the spiral shape of the winding of the first vertical driving coil 33a.

Therefore, the lengths of the first vertical position-detecting and driving magnet 411b and the first vertical position-detecting and driving yoke 431b can be shortened in the second direction y, so that the anti-shake apparatus 30 can be downsized, in comparison with when the first vertical hall element hv1 is arranged outside the first vertical driving coil 33a in the second direction y.

Further, it is desirable that the first vertical hall element hv1 is arranged midway along an outer circumference of the spiral shape of the winding of the first vertical driving coil 33a in the second direction y.

In this case, the center of the movement range of the movable unit 30a in the second direction y and the center of the position detecting range of the first vertical hall element hv1 can agree, so that the movement range of the movable unit 30a in the second direction y and the position detecting range of the first vertical hall element hv1 can be utilized.

Similarly, the second vertical hall element hv2 is arranged inside the spiral shape of the winding of the second vertical driving coil 34a.

Therefore, the lengths of the second vertical position-detecting and driving magnet 412b and the second vertical position-detecting and driving yoke 432b can be shortened in the second direction y, so that the anti-shake apparatus 30 can be downsized, in comparison with when the second vertical hall element hv2 is arranged outside the second vertical driving coil 34a in the second direction Further, it is desirable that the second vertical hall element hv2 is arranged midway along an outer circumference of the spiral shape of the winding of the second vertical driving coil 34a in the second direction y.

In this case, the center of the movement range of the movable unit 30a in the second direction y and the center of the position detecting range of the second vertical hall element hv2 can agree, so that the movement range of the movable unit 30a in the second direction y and the position detecting range of the second vertical hall element hv2 can be utilized.

Further, because the first horizontal hall element hh1 is arranged inside the first horizontal driving coil 31a, even if the two seat coils of the first horizontal driving coil 31a and the first horizontal hall element hh1 are layered on the second movable circuit board 49a2 in the second direction y (see FIG. 7), the thickness of the part of the second movable circuit board 49a2 to which the first horizontal driving coil 31a and the first horizontal hall element hh1 are attached, is not increased in the second direction y.

Similarly, because the second horizontal hall element hh2 is arranged inside the second horizontal driving coil 32a, even if the two seat coils of the second horizontal driving coil 32a and the second horizontal hall element hh2 are layered on the third movable circuit board 49a3 in the second direction y, the thickness of the part of the third movable circuit board 49a3 to which the second horizontal driving coil 32a and the second horizontal hall element hh2 are attached, is not increased in the second direction y.

Similarly, because the first vertical hall element hv1 is arranged inside the first vertical driving coil 33a, even if the two seat coils of the first vertical driving coil 33a and the first vertical hall element hv1 are layered on the fourth movable circuit board 49a4 in the first direction x, the thickness of the part of the fourth movable circuit board 49a4 to which the first vertical driving coil 33a and the first vertical hall element hv1 are attached, is not increased in the first direction x.

Similarly, because the second vertical hall element hv2 is arranged inside the second vertical driving coil 34a, even if the two seat coils of the second vertical driving coil 34a and the second vertical hall element hv2 are layered on the fifth movable circuit board 49a5 in the first direction x, the thickness of the part of the fifth movable circuit board 49a5 to which the second vertical driving coil 34a and the second vertical hall element hv2 are attached, is not increased in the first direction x.

When the center of the imaging device 39a1, passes through the optical axis LX, it is desirable that the first horizontal hall element hh1 is located at a place on the hall element unit 44a which faces an intermediate area between the N pole and S pole of the first horizontal position-detecting and driving magnet 401b in the first direction x, viewed from the third direction z, to perform the position-detecting operation utilizing the full size of the range where an accurate position-detecting operation can be performed based on the linear output-change (linearity) of the one-axis hall element.

Similarly, when the center of the imaging device 39a1, passes through the optical axis LX, it is desirable that the second horizontal hall element hh2 is located at a place on the hall element unit 44a which faces an intermediate area between the N pole and S pole of the second horizontal position-detecting and driving magnet 402b in the first direction x, viewed from the third direction z.

Similarly, when the center of the imaging device 39a1, passes through the optical axis LX, it is desirable that the first vertical hall element hv1 is located at a place on the hall element unit 44a which faces an intermediate area between the N pole and S pole of the first vertical position-detecting and driving magnet 411b in the second direction y, viewed from the third direction z.

Similarly, when the center of the imaging device 39a1, passes through the optical axis LX, it is desirable that the second vertical hall element hv2 is located at a place on the hall element unit 44a which faces an intermediate area between the N pole and S pole of the second vertical position-detecting and driving magnet 412b in the second direction y, viewed from the third direction z.

When the center area of the imaging device 39a1, passes through the optical axis LX, the location relation between the first and second horizontal hall elements hh1 and hh2 is set up so that a first distance d1 between the first horizontal hall element hh1 and the first horizontal position-detecting and driving magnet 401b in the second direction y, is the same as a second distance d2 between the second horizontal hall element hh2 and the second horizontal position-detecting and driving magnet 402b in the second direction y.

In this case, it is desirable that the location relation between the movable unit 30a and the fixed unit 30b is set up so that a distance between the first horizontal position-detecting and driving magnet 401b and the center area of the imaging device 39a1 in the second direction y, is the same as a distance between the second horizontal position-detecting and driving magnet 402b and the center area of the imaging device 39a1 in the second direction y.

It is possible for the position-detecting apparatuses for positioning in the first direction x, such as the first horizontal hall element hh1 etc., to be arranged in an almost symmetric pattern centering on the optical axis LX in the second direction y. Specifically, the first and second horizontal hall elements hh1 and hh2 are arranged in an almost symmetric pattern centering on the optical axis LX in the second direction y, the first and second horizontal position-detecting and driving magnets 401b and 402b are arranged in an almost symmetric pattern centering on the optical axis LX in the second direction y, and the first and second horizontal position-detecting and driving yokes 411b and 412b are arranged in an almost symmetric pattern centering on the optical axis LX in the second direction y.

Further, it is possible for the moving apparatuses that moves in the first direction x, such as the first horizontal driving coil 31a etc., to be arranged in an almost symmetric pattern centering on the optical axis LX in the second direction y, based on the location relation between the hall element and coil. Specifically, the first and second horizontal driving coils 31a and 32a are arranged in an almost symmetric pattern centering on the optical axis LX in the second direction y.

When the center area of the imaging device 39a1, passes through the optical axis LX, the location relation between the first and second vertical hall elements hv1 and hv2 is set up so that a third distance d3 between the first vertical hall element hv1 and the first vertical position-detecting and driving magnet 411b in the first direction x, is the same as a fourth distance d4 between the second vertical hall element hv2 and the second vertical position-detecting and driving magnet 412b in the first direction x.

In this case, it is desirable that the location relation between the movable unit 30a and the fixed unit 30b is set up so that a distance between the first vertical position-detecting and driving magnet 411b and the center area of the imaging device 39a1 in the first direction x, is the same as a distance between the second vertical position-detecting and driving magnet 412b and the center area of the imaging device 39a1 in the first direction x.

It is possible for the position-detecting apparatuses for positioning in the second direction y, such as the first vertical hall element hv1 etc., to be arranged in an almost symmetric pattern centering on the optical axis LX in the first direction x. Specifically, the first and second vertical hall elements hv1 and hv2 are arranged in an almost symmetric pattern centering on the optical axis LX in the first direction x, the first and second vertical position-detecting and driving magnets 411b and 412b are arranged in an almost symmetric pattern centering on the optical axis LX in the first direction x, and the first and second vertical position-detecting and driving yokes 421b and 422b are arranged in an almost symmetric pattern centering on the optical axis LX in the first direction x.

Further, it is possible for the moving apparatuses that moves in the second direction y, such as the first vertical driving coil 33a etc., to be arranged in an almost symmetric pattern centering on the optical axis LX in the first direction x, based on the location relation between the hall element and coil. Specifically, the first and second vertical driving coils 33a and 34a are arranged in an almost symmetric pattern centering on the optical axis LX in the first direction x.

The base board 65b is a plate state member which becomes the base for attaching the first horizontal position-detecting and driving yoke 421b etc., and is arranged being parallel to the imaging surface of the imaging device 39a1.

In the first embodiment, the base board 65b is arranged at the side nearer to the photographing optical system 67 in comparison with the movable circuit board 49a, in the third direction z. However, the movable circuit board 49a may be arranged at the side nearer to the photographing optical system 67 in comparison with the base board 65b.

The first and second horizontal driving coils 31a and 32a have the same characteristics, the first and second vertical driving coils 33a and 34a have the same characteristics, the first and second horizontal position-detecting and driving magnets 401b and 402b have the same characteristics, the first and second vertical position-detecting and driving magnets 411b and 412b have the same characteristics, the first and second horizontal position-detecting and driving yokes 421b and 422b have the same characteristics, the first and second vertical position-detecting and driving yokes 431b and 432b have the same characteristics, the first and second horizontal hall elements hh1 and hh2 have the same characteristics, and the first and second vertical hall elements hv1 and hv2 have the same characteristics, in order to perform the moving operation for the movable unit 30a and the position-detecting operation for the movable unit 30a, along the directions of the shaft for movement 50a (the first direction x and the second direction y).

The hall-element signal-processing unit 45 has first and second hall-element signal-processing circuits 450 and 460.

The first hall-element signal-processing circuit 450 detects a first horizontal potential-difference x1 between the output terminals of the first horizontal hall element hh1, based on an output signal of the first horizontal hall element hh1, and detects a second horizontal potential-difference x2 between the output terminals of the second horizontal hall element hh2, based on an output signal of the second horizontal hall element hh2.

The first hall-element signal-processing circuit 450 outputs the first detected-position signal px, which specifies the first location in the first direction x of the movable unit 30a, to the A/D converter A/D 2 of the CPU 21, on the basis of an average value of the first and second horizontal potential-differences x1 and x2.

The second hall-element signal-processing circuit 460 detects a first vertical potential-difference y1 between output terminals of the first vertical hall element hv1, based on an output signal of the first vertical hall element hv1, and detects a second vertical potential-difference y2 between output terminals of the second vertical hall element hv2, based on an output signal of the second vertical hall element hv2.

The second hall-element signal-processing circuit 460 outputs the second detected-position signal py, which specifies the second location in the second direction y of the movable unit 30a, to the A/D converter A/D 3 of the CPU 21, on the basis of an average value of the first and second vertical potential-differences y1 and y2.

Figure 8:
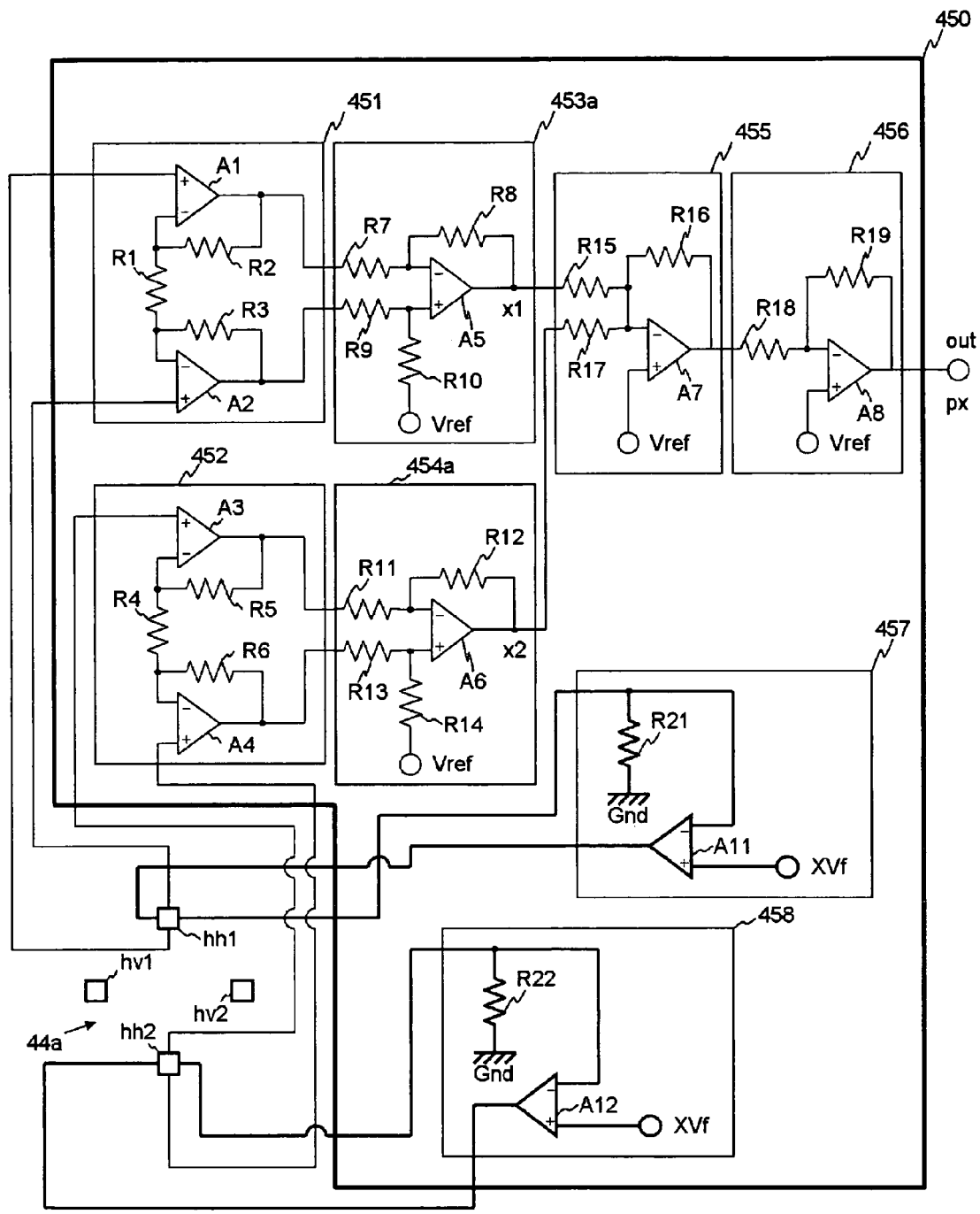
FIG. 8 is a circuit construction diagram of the circuit of the hall element unit and the first hall-element signal-processing circuit in the first embodiment.

The circuit construction regarding input/output signals of the first and second horizontal hall elements hh1 and hh2, of the first hall-element signal-processing circuit 450 of the hall-element signal-processing unit 45, and the circuit construction regarding input/output signals of the first and second vertical hall elements hv1 and hv2, of the second hall-element signal-processing circuit 460 of the hall-element signal-processing unit 45 are explained using FIG. 8. In FIG. 8, the circuit construction of the second hall-element signal-processing circuit 460 (regarding input/output signals of the first and second vertical hall elements hv1 and hv2) is omitted (see FIG. 16).

The first hall-element signal-processing circuit 450 has a first horizontal differential amplifier circuit 451, a second horizontal differential amplifier circuit 452, a first horizontal subtracting circuit 453a, a second horizontal subtracting circuit 454a, a horizontal adder circuit 455, and a horizontal inverting amplifier circuit 456, for controlling the outputs of the first and second horizontal hall elements hh1 and hh2, and has a first horizontal power circuit 457 and a second horizontal power circuit 458 for controlling the inputs of the first and second horizontal hall elements hh1 and hh2.

Both output terminals of the first horizontal hall element hh1 are connected with the first horizontal differential amplifier circuit 451, so that the first horizontal differential amplifier circuit 451 is connected with the first horizontal subtracting circuit 453a.

The first horizontal differential amplifier circuit 451 is a differential amplifier which amplifies the signal difference between the output terminals of the first horizontal hall element hh1.

The first horizontal subtracting circuit 453a is a subtracting circuit which calculates the first horizontal potential-difference x1 (the hall output voltage) on the basis of the difference between the amplified signal difference from the first horizontal differential amplifier circuit 451 and a reference voltage Vref.

Both output terminals of the second horizontal hall element hh2 are connected with the second horizontal differential amplifier circuit 452, so that the second horizontal differential amplifier circuit 452 is connected with the second horizontal subtracting circuit 454a.

The second horizontal differential amplifier circuit 452 is a differential amplifier which amplifies the signal difference between the output terminals of the second horizontal hall element hh2.

The second horizontal subtracting circuit 454a is a subtracting circuit which calculates the second horizontal potential-difference x2 (the hall output voltage) on the basis of the difference between the amplified signal difference from the second horizontal differential amplifier circuit 452 and a reference voltage Vref.

The first and second horizontal subtracting circuits 453a and 454a are connected with the horizontal adder circuit 455. The horizontal adder circuit 455 is connected with the horizontal inverting amplifier circuit 456. The horizontal inverting amplifier circuit 456 is connected with the CPU 21.

The horizontal adder circuit 455 and the horizontal inverting amplifier circuit 456 are an adder and an inverting amplifier which calculate an average value between the first and second horizontal potential-differences x1 and x2 and calculate the first detected-position signal px by multiplying a predetermined amplification rate by the average value between the first and second horizontal potential-differences x1 and x2.

The first horizontal differential amplifier circuit 451 has a resistor R1, a resistor R2, a resistor R3, an operational amplifier A1, and an operational amplifier A2. The operational amplifier A1 has an inverting input terminal, a non-inverting input terminal, and an output terminal. The operational amplifier A2 has an inverting input terminal, a non-inverting input terminal, and an output terminal.

One of the output terminals of the first horizontal hall element hh1 is connected with the non-inverting input terminal of the operational amplifier A1, so that the other terminal of the first horizontal hall element hh1 is connected with the non-inverting input terminal of the operational amplifier A2.

The inverting input terminal of the operational amplifier A1 is connected with the resistors R1 and R2, so that the inverting input terminal of the operational amplifier A2 is connected with the resistors R1 and R3.

The output terminal of the operational amplifier A1 is connected with the resistor R2 and the resistor R7 in the first horizontal subtracting circuit 453a. The output terminal of the operational amplifier A2 is connected with the resistor R3 and the resistor R9 in the first horizontal subtracting circuit 453a.

The second horizontal differential amplifier circuit 452 has a resistor R4, a resistor R5, a resistor R6, an operational amplifier A3, and an operational amplifier A4. The operational amplifier A3 has an inverting input terminal, a non-inverting input terminal, and an output terminal. The operational amplifier A4 has an inverting input terminal, a non-inverting input terminal, and an output terminal.

One of the output terminals of the second horizontal hall element hh2 is connected with the non-inverting input terminal of the operational amplifier A3, so that the other terminal of the second horizontal hall element hh2 is connected with the non-inverting input terminal of the operational amplifier A4.

The inverting input terminal of the operational amplifier A3 is connected with the resistors R4 and R5, so that the inverting input terminal of the operational amplifier A4 is connected with the resistors R4 and R6.

The output terminal of the operational amplifier A3 is connected with the resistor R5 and the resistor R11 in the second horizontal subtracting circuit 454a. The output terminal of the operational amplifier A4 is connected with the resistor R6 and the resistor R13 in the second horizontal subtracting circuit 454a.

The first horizontal subtracting circuit 453a has a resistor R7, a resistor R8, a resistor R9, a resistor R10, and an operational amplifier A5. The operational amplifier A5 has an inverting input terminal, a non-inverting input terminal, and an output terminal.

The inverting input terminal of the operational amplifier A5 is connected with the resistors R7 and R8. The non-inverting input terminal of the operational amplifier A5 is connected with the resistors R9 and R10. The output terminal of the operational amplifier A5 is connected with the resistor R8, and the resistor R15 in the horizontal adder circuit 455. The first horizontal potential-difference x1 is output from the output terminal of the operational amplifier A5. One of the terminals of the resistor R10 is connected with the power supply whose voltage is the reference voltage Vref.

The second horizontal subtracting circuit 454a has a resistor R11, a resistor R12, a resistor R13, a resistor R14, and an operational amplifier A6. The operational amplifier A6 has an inverting input terminal, a non-inverting input terminal, and an output terminal.

The inverting input terminal of the operational amplifier A6 is connected with the resistors R11 and R12. The non-inverting input terminal of the operational amplifier A6 is connected with the resistors R13 and R14. The output terminal of the operational amplifier A6 is connected with the resistor R12, and the resistor R17 in the horizontal adder circuit 455. The second horizontal potential-difference x2 is output from the output terminal of the operational amplifier A6. One of the terminals of the resistor R14 is connected with the power supply whose voltage is the reference voltage Vref.

The horizontal adder circuit 455 has a resistor R15, a resistor R16, a resistor R17, and an operational amplifier A7. The operational amplifier A7 has an inverting input terminal, a non-inverting input terminal, and an output terminal.

The inverting input terminal of the operational amplifier A7 is connected with the resistors R15, R16, and R17. The non-inverting input terminal of the operational amplifier A7 is connected with the power supply whose voltage is the reference voltage Vref. The output terminal of the operational amplifier A7 is connected with the resistor R16, and the resistor R18 in the horizontal inverting amplifier circuit 456. The values of the resistors R15 and R17 are the same. The value of the resistor R16 is half of the value of the resistor R15. Accordingly, the average value output from the amplifiers A5 and A6, in other words the value which is obtained by dividing the output values from the amplifiers A5 and A6 by 2, is output from the amplifier A7.

The horizontal inverting amplifier circuit 456 has a resistor R18, a resistor R19, and an operational amplifier A8. The operational amplifier A8 has an inverting input terminal, a non-inverting input terminal, and an output terminal.

The inverting input terminal of the operational amplifier A8 is connected with the resistors R18 and R19. The non-inverting input terminal of the operational amplifier A8 is connected with the power supply whose voltage is the reference voltage Vref. The output terminal of the operational amplifier A8 is connected with the resistor R19. The first detected-position signal px is output from the output terminal of the operational amplifier A8 to the A/D converter A/D 2 of the CPU 21.

The values of the resistors R1 and R4 are the same. The values of the resistors R2, R3, R5 and R6 are the same. The values of the resistors R7, R8, R9, R10, R11, R12, R13 and R14 are the same. The values of the resistors R15 and R17 are the same. The value of the resistor R16 is half of the value of the resistor R15. The values of the resistors R18 and R19 are the same.

The operational amplifiers A1, A2, A3 and A4 are the same type of amplifier. The operational amplifiers A5 and A6 are the same type of amplifier.

The first horizontal power circuit 457 has a resistor R21 and an operational amplifier A11. The operational amplifier A11 has an inverting input terminal, a non-inverting input terminal, and an output terminal.

The inverting input terminal of the operational amplifier A11 is connected with the resistor R21 and one of the input terminals of the first horizontal hall element hh1. The potential of the non-inverting input terminal of the operational amplifier A11 is set at the first voltage XVf corresponding to the value of the current that flows through the input terminals of the first horizontal hall element hh1. The output terminal of the operational amplifier A11 is connected with the other input terminal of the first horizontal hall element hh1. One of the terminals of the resistor R21 is grounded.

The second horizontal power circuit 458 has a resistor R22 and an operational amplifier A12. The operational amplifier A12 has an inverting input terminal, a non-inverting input terminal, and an output terminal.

The inverting input terminal of the operational amplifier A12 is connected with the resistor R22 and one of the input terminals of the second horizontal hall element hh2. The potential of the non-inverting input terminal of the operational amplifier A12 is set at the first voltage XVf corresponding to the value of the current that flows through the input terminals of the second horizontal hall element hh2. The output terminal of the operational amplifier A12 is connected with the other input terminal of the second horizontal hall element hh2. One of the terminals of the resistor R22 is grounded.

The circuit construction regarding input/output signals of the first and second vertical hall elements hv1 and hv2, of the second hall-element signal-processing circuit 460 of the hall-element signal-processing unit 45, is similar to the circuit construction regarding the input/output signals of the first and second horizontal hall elements hh1 and hh2, of the first hall-element signal-processing circuit 450 of the hall-element signal-processing unit 45.

Figure 16:
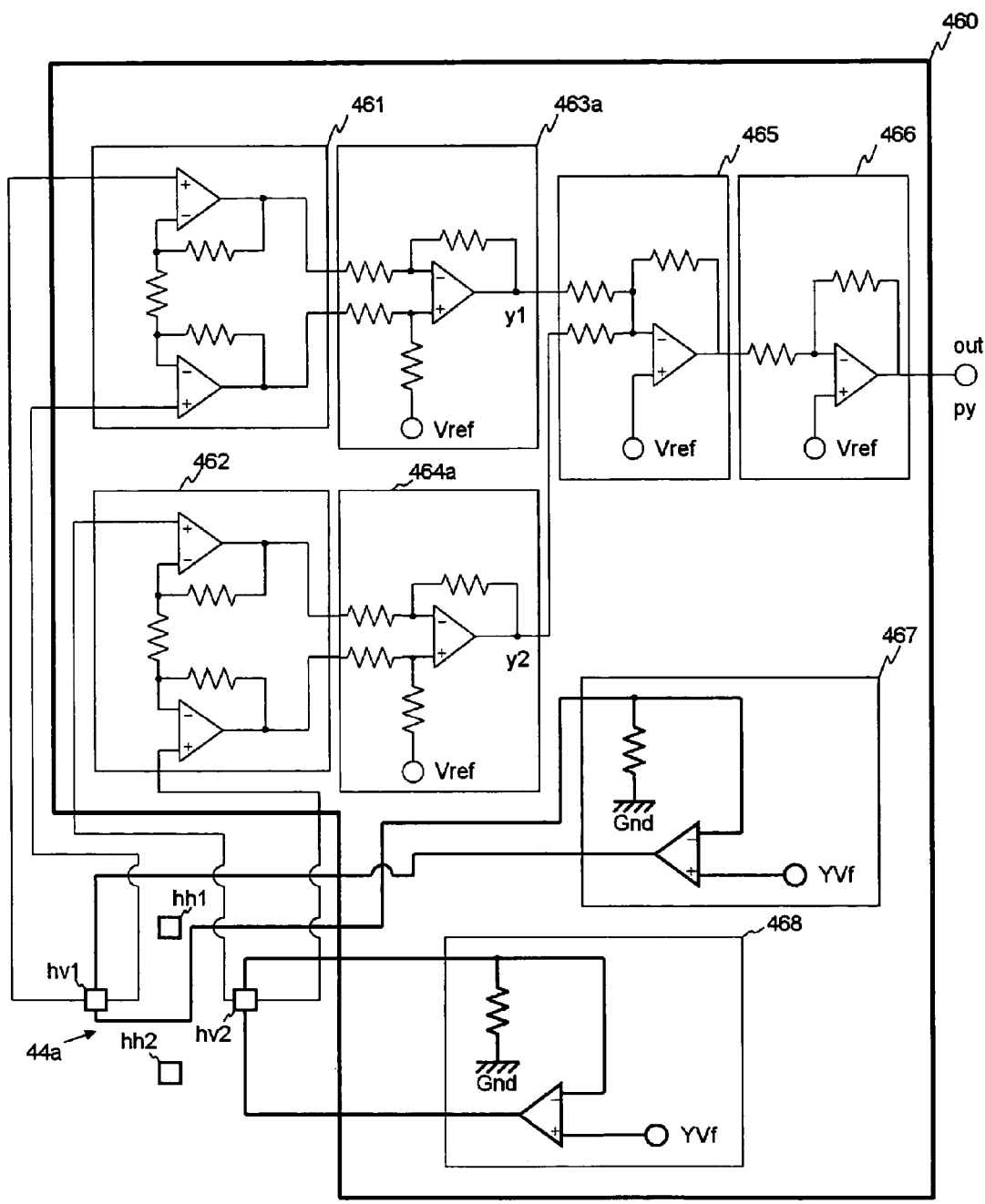
FIG. 16 is a circuit construction diagram of the hall element unit and the second hall-element signal-processing circuit in the first embodiment.

The second hall-element signal-processing circuit 460 has a first vertical differential amplifier circuit 461 which is equivalent to the first horizontal differential amplifier circuit 451, a second vertical differential amplifier circuit 462 which is equivalent to the second horizontal differential amplifier circuit 452, a first vertical subtracting circuit 463 which is equivalent to the first horizontal subtracting circuit 453a, a second vertical subtracting circuit 464 which is equivalent to the second horizontal subtracting circuit 454a, a vertical adder circuit 465 which is equivalent to the horizontal adder circuit 455, and a vertical inverting amplifier circuit 466 which is equivalent to the horizontal inverting amplifier circuit 466, for controlling the outputs of the first and second vertical hall elements hv1 and hv2 (see FIG. 16).

The second hall-element signal-processing circuit 460 has a first vertical power circuit 467 which is equivalent to the first horizontal power circuit 457 and a second vertical power circuit 468 which is equivalent to the second horizontal power circuit 458, for controlling the inputs of the first and second vertical hall elements hv1 and hv2. In FIG. 16, the circuit construction of the first hall-element signal-processing circuit 450 (regarding input/output signals of the first and second horizontal hall elements hh1 and hh2) is omitted (see FIG. 8).

The first vertical potential-difference y1 which is equivalent to the first horizontal potential-difference x1 is output from the first vertical subtracting circuit 463. The second vertical potential-difference y2 which is equivalent to the second horizontal potential-difference x2 is output from the second vertical subtracting circuit 464. The second detected-position signal py which is equivalent to the first detected-position signal px is output from the vertical inverting amplifier circuit 466.

The second voltage YVf is applied to the input terminals of the first vertical hall element hv1 through the first vertical power circuit 467, and is applied to the input terminals of the second vertical hall element hv2 through the second vertical power circuit 468.

In the first embodiment, the members for performing the anti-shake operation, such as the hall element etc., are arranged on a plane which is perpendicular to the first direction x or the second direction y. Accordingly, the number of members which are arranged on a plane which is perpendicular to the third direction z, can be decreased, so that the anti-shake apparatus is not enlarged in the first direction x and the second direction y, in comparison with when the members for performing the anti-shake operation are arranged on a plane which is perpendicular to the third direction z.

A lot of members for operations other than the anti-shake operation, such as the photographing optical system 67 etc., are arranged on the planes which are perpendicular to the plane being perpendicular to the third direction z, and on which the members for performing the anti-shake operation are arranged. Accordingly, even if the members for performing the anti-shake operation are arranged on the plane around the members for the operations other than the anti-shake operation, the photographing apparatus is not enlarged.

Therefore, in the first embodiment, the size of the photographing apparatus including the anti-shake apparatus can be reduced in comparison with the photographing apparatus including the anti-shake apparatus where the members for performing the anti-shake operation are arranged on a plane which is perpendicular to the third direction z.

Especially, in the case where the length of the photographing apparatus in the third direction z is long, for example the photographing apparatus has a zoom lens (the photographing optical system 67 is consist of a zoom lens), this effect becomes more noticeable.

Further, because the members for driving the movable unit 30a, such as coils and magnets, are arranged in an almost symmetric pattern centering on the optical axis LX in the first direction x or the second direction y, an accurate urging along the shaft for movement 50a can be performed. Therefore, a driving resistance of the movable unit 30a can be restrained, so that a low-power for the anti-shake operation and a fast response speed to driving can be obtained.

Further, in the first embodiment, when the movable unit 30a is moved in the second direction y, the values of the first distance d1 and the second distance d2 change.

Similarly, when the movable unit 30a is moved in the first direction x, the values of the third distance d3 and the fourth distance d4 change.

When the distance between the hall element and the magnet changes, the magnetic-flux density between the hall element and the magnet changes, so that value of the output signal from the hall element changes.

Figure 9:
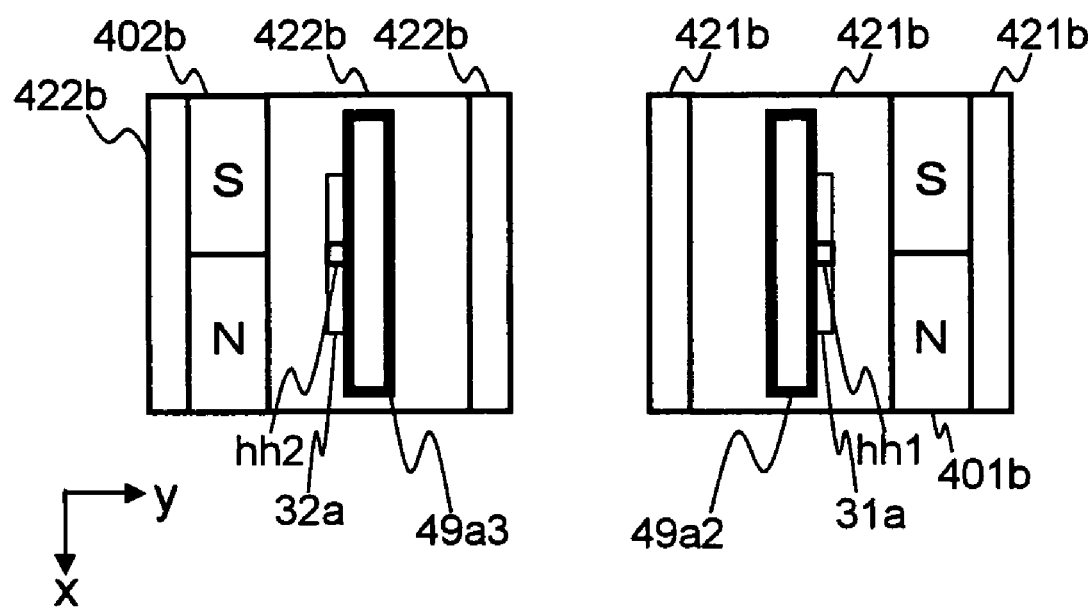
FIG. 9 is a diagram showing a first location relation of the first and second horizontal position-detecting and driving magnets and the first and second horizontal hall elements, when the movable unit is in the center of its movement range in the second direction.

FIG. 9 shows a first location relation of the first and second horizontal position-detecting and driving magnets 401b and 402b and the first and second horizontal hall elements hh1 and hh2, when the movable unit 30a is in the center of its movement range in the second direction y. In FIG. 9, the first movable circuit board 49a1 etc., is omitted for simplifying.

Figure 10:
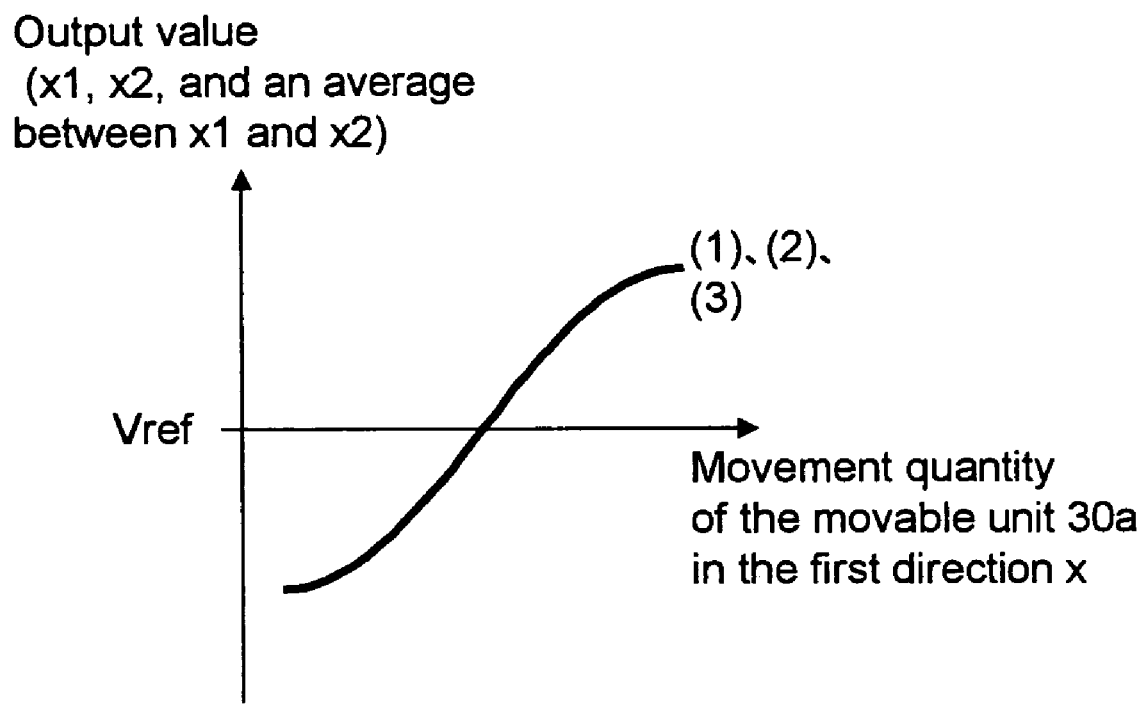
FIG. 10 is a graph which shows a relationship between the first and second horizontal potential-differences and the location of the movable unit in the first direction, when the movable unit is in the center of its movement range in the second direction.

FIG. 10 is a graph which shows a relationship between the first and second horizontal potential-differences x1 and x2 and the location of the movable unit 30a in the first direction x, when the movable unit 30a is in the center of its movement range in the second direction y.

In this case, because the values of the first distance d1 and the second distance d2 are the same, the magnetic-flux density between the first horizontal position-detecting magnet 401b and the first horizontal hall element hh1, and the magnetic-flux density between the second horizontal position-detecting magnet 402b and the second horizontal hall element hh2 are the same. Accordingly, a first curve line (1) which shows the values of the first horizontal potential-difference x1, agrees with a second curve line (2) which shows the values of the second horizontal potential-difference x2. Therefore, a third curve line (3) which shows the average values of the first horizontal potential-difference x1 and the second horizontal potential-difference x2, agrees with the first curve line (1) and the second curve line (2).

Figure 11:
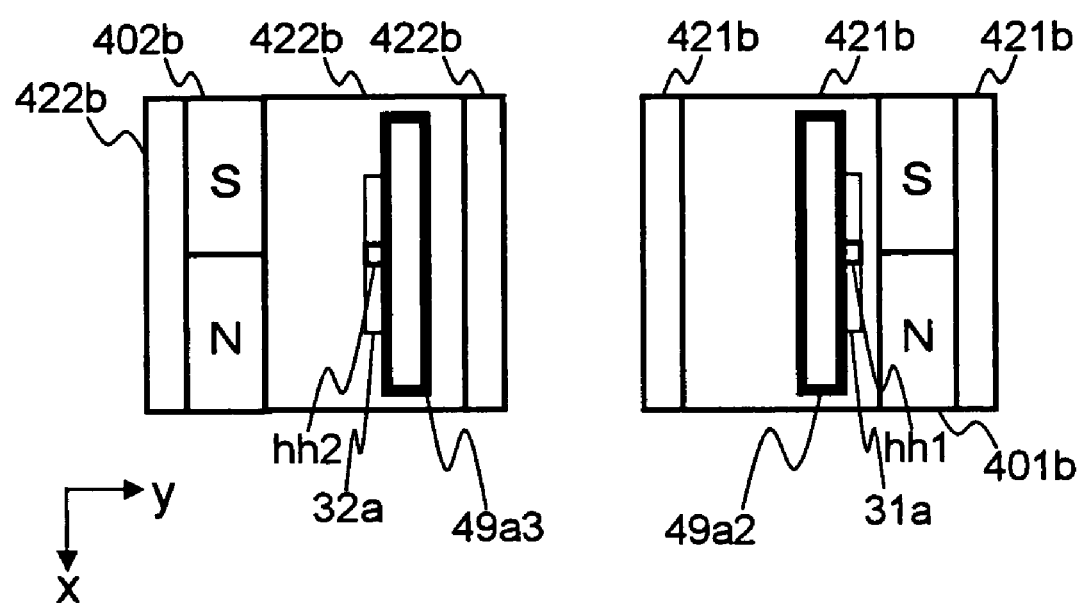
FIG. 11 is a diagram showing a second location relation of the first and second horizontal position-detecting and driving magnets and the first and second horizontal hall elements, when the movable unit is at the near side of the first horizontal position-detecting magnet in comparison with the second horizontal position-detecting magnet, in the second direction.

FIG. 11 shows a second location relation of the first and second horizontal position-detecting and driving magnets 401b and 402b and the first and second horizontal hall elements hh1 and hh2, when the movable unit 30a is at the near side of the first horizontal position-detecting magnet 401b in comparison with the second horizontal position-detecting magnet 402b in the second direction y. In FIG. 11, the first movable circuit board 49a1 etc., is omitted for simplicity.

Figure 12:
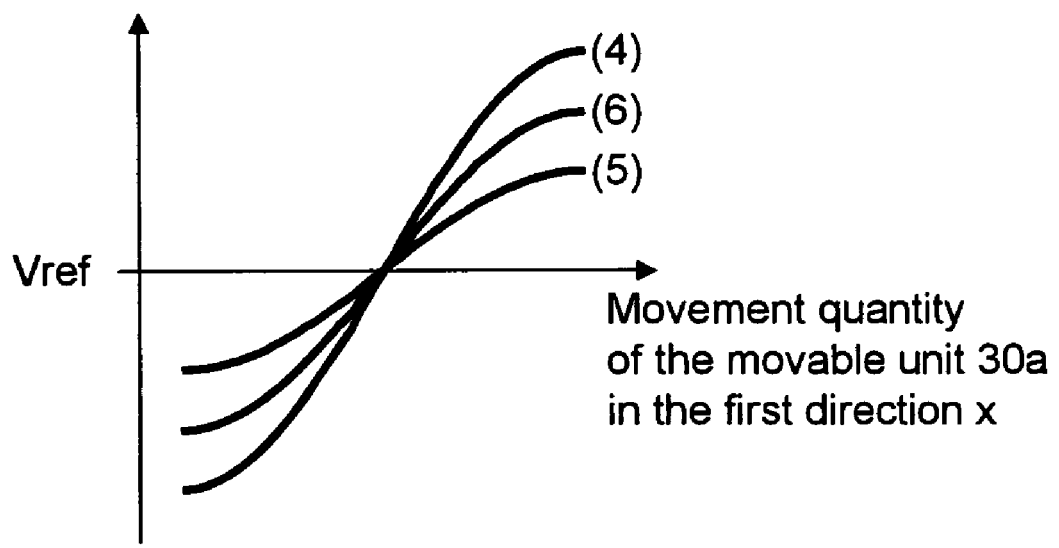
FIG. 12 is a graph which shows a relationship between the first and second horizontal potential-differences and the location of the movable unit in the first direction, when the movable unit is at the near side of the first horizontal position-detecting magnet in comparison with the second horizontal position-detecting magnet, in the second direction.

FIG. 12 is a graph which shows a relationship between the first and second horizontal potential-differences x1 and x2 and the location of the movable unit 30a in the first direction x, when the movable unit 30a is at the near side of the first horizontal position-detecting magnet 401b in comparison with the second horizontal position-detecting magnet 402b in the second direction y.

In this case, because the first distance d1 is shorter than the second distance d2, the magnetic-flux density between the first horizontal position-detecting magnet 401b and the first horizontal hall element hh1, is larger than the magnetic-flux density between the second horizontal position-detecting magnet 402b and the second horizontal hall element hh2.

Accordingly, an output range of a fourth curve line (4) which shows the values of the first horizontal potential-difference x1, is wider than an output range of a fifth curve line (5) which shows the values of the second horizontal potential-difference x2. However, a sixth curve line (6) which shows the average values of the first horizontal potential-difference x1 and the second horizontal potential-difference x2, agrees with the third curve line (3) in FIG. 10. This is because an increased quantity of the first distance d1 in comparison with when the movable unit 30*a* is in the center of its movement range in the second direction y, is the same as a decreased quantity of the second distance d2 in comparison with when the movable unit 30*a* is in the center of its movement range in the second direction y.

Figure 13:
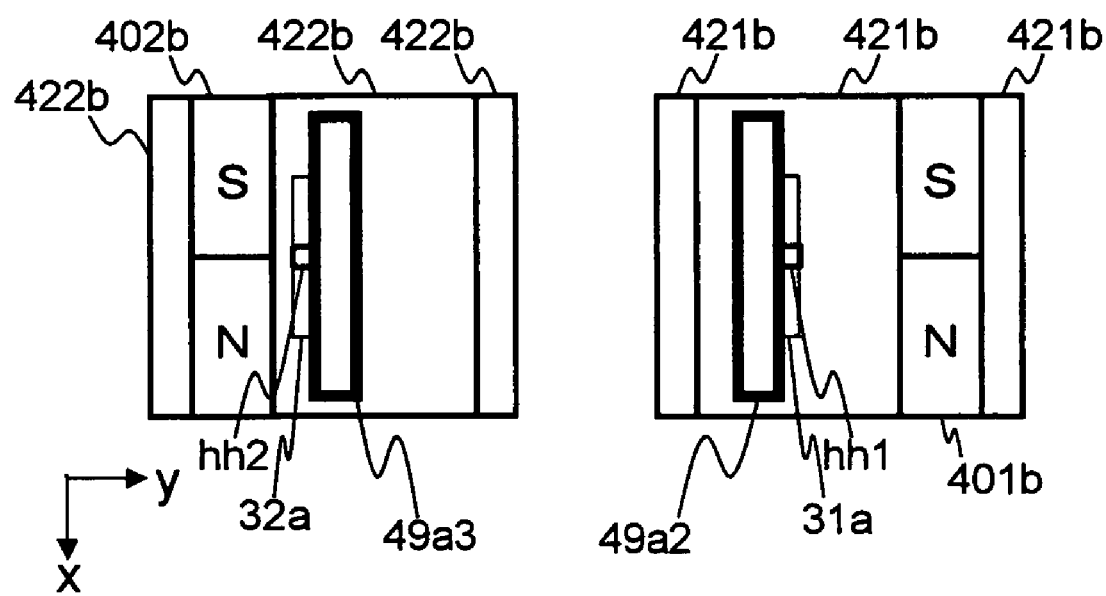
FIG. 13 is a diagram showing a second location relation of the first and second horizontal position-detecting and driving magnets and the first and second horizontal hall elements, when the movable unit is at the near side of the second horizontal position-detecting magnet in comparison with the first horizontal position-detecting magnet, in the second direction.

FIG. 13 shows a second location relation of the first and second horizontal position-detecting and driving magnets 401*b* and 402*b* and the first and second horizontal hall elements hh1 and hh2, when the movable unit 30*a* is at the near side of the second horizontal position-detecting magnet 402*b* in comparison with the first horizontal position-detecting magnet 401*b* in the second direction y. In FIG. 13, the first movable circuit board 49*a*1 etc., is omitted for simplicity.

Figure 14:
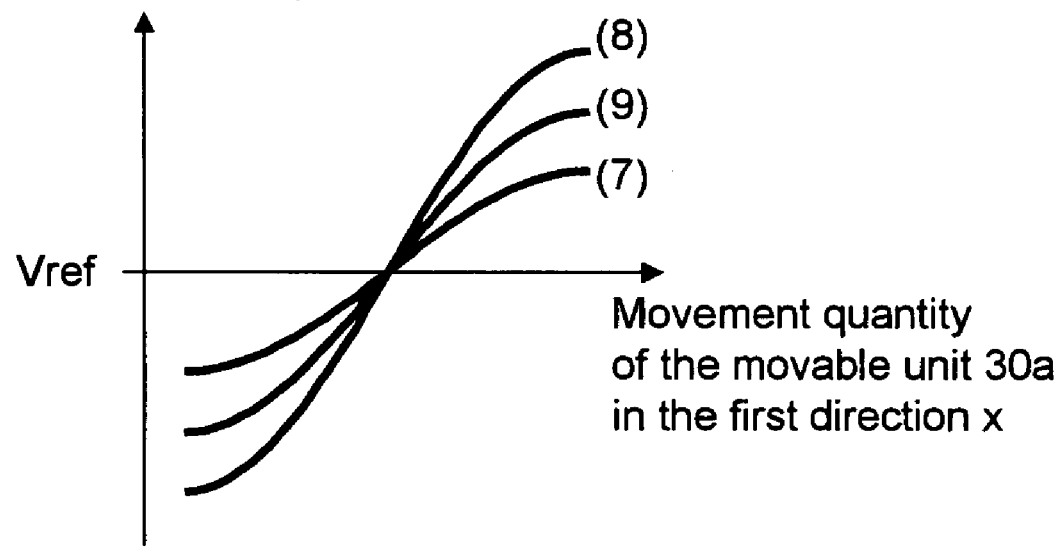
FIG. 14 is a graph which shows a relationship between the first and second horizontal potential-differences and the location of the movable unit in the first direction, when the movable unit is at the near side of the second horizontal position-detecting magnet in comparison with the first horizontal position-detecting magnet, in the second direction.

FIG. 14 is a graph which shows a relationship between the first and second horizontal potential-differences x1 and x2 and the location of the movable unit 30*a* in the first direction x, when the movable unit 30*a* is at the near side of the second horizontal position-detecting magnet 402*b* in comparison with the first horizontal position-detecting magnet 401*b* in the second direction y.

In this case, because the first distance d1 is longer than the second distance d2, the magnetic-flux density between the first horizontal position-detecting magnet 401*b* and the first horizontal hall element hh1, is smaller than the magnetic-flux density between the second horizontal position-detecting magnet 402*b* and the second horizontal hall element hh2. Accordingly, an output range of a seventh curve line (7) which shows the values of the first horizontal potential-difference x1, is narrower than an output range of a eighth curve line (8) which shows the values of the second horizontal potential-difference x2. However, a ninth curve line (9) which shows the average values of the first horizontal potential-difference x1 and the second horizontal potential-difference x2, agrees with the third curve line (3) in FIG. 10. This is because a decreased quantity of the first distance d1 in comparison with when the movable unit 30*a* is in the center of its movement range in the second direction y, is the same as an increased quantity of the second distance d2 in comparison with when the movable unit 30*a* is in the center of its movement range in the second direction y.

In other words, when the movable unit 30*a* is moved in the second direction y under the condition where the first distance d1 increases, the value of the second distance d2 decreases only by the increased quantity of the first distance d1.

Similarly, when the movable unit 30*a* is move in the first direction x under the condition where the third distance d3 increases, the value of the fourth distance d4 decreases only by the increased quantity of the third distance d3.

In the first embodiment, the value which is obtained by multiplying by a predetermined amplification rate by an average value between the first horizontal potential-difference x1 and the second horizontal potential-difference x2, is defined as the first detected-position signal px, on the basis that the increased quantity of the first distance d1 is the same as the decreased quantity of the second distance d2. Therefore, an accurate position detecting operation in the first direction x can be performed considering the movement quantity in the second direction y of the movable unit 30*a*.

Similarly, the value which is obtained by multiplying by a predetermined amplification rate by an average value between the first vertical potential-difference y1 and the second vertical potential-difference y2, is defined as the second detected-position signal py, on the basis that the increased quantity of the third distance d3 is the same as the decreased quantity of the fourth distance d4. Therefore, an accurate position detecting operation in the second direction y can be performed considering the movement quantity in the first direction x of the movable unit 30*a*.

Figure 15:
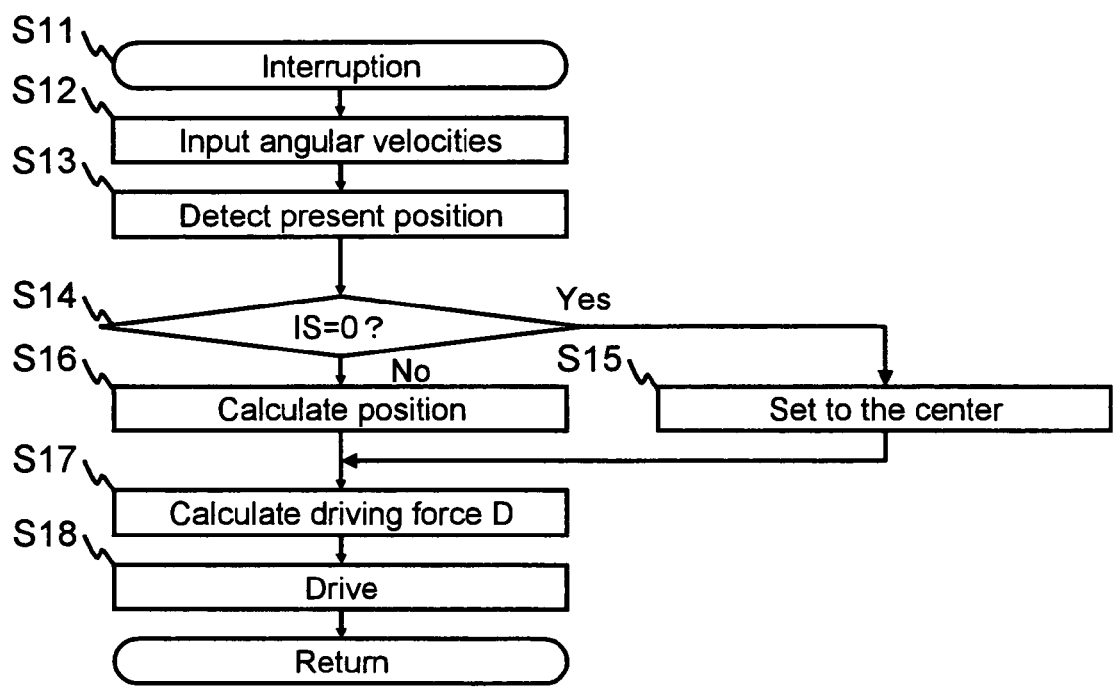
FIG. 15 is a flowchart of the anti-shake operation, which is performed at every first time-interval, as an interruption process.

Next, the flow of the anti-shake operation, which is performed at every predetermined time interval (1 ms) as an interruption process, independently of the other operations, is explained by using the flowchart in FIG. 15.

In step S11, the interruption process for the anti-shake operation is started. In step S12, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal.

In step S13, the position of the movable unit 30*a* is detected by the hall element unit 44*a*, so that the first detected-position signal px, which is calculated by the hall-element signal-processing unit 45, is input to the A/D converter A/D 2 of the CPU 21 and is converted to a digital signal (pdx), and the second detected-position signal py, which is calculated by the hall-element signal-processing unit 45, is input to the A/D converter A/D 3 of the CPU 21 and is converted to a digital signal (pdy). Therefore, the present position of the movable unit 30*a* P (pdx, pdy) is determined.

In step S14, it is judged whether the value of the IS is 0. When it is judged that the value of the IS is 0 (IS=0), in other words in the non anti-shake mode, the position S (sx, sy) of the movable unit 30*a* (the imaging unit 39*a*), which should be moved to, is set to the center of the movement range of the movable unit 30*a*, in step S15. When it is judged that the value of the IS is not 0 (IS=1), in other words in the anti-shake mode, the position S (sx, sy) of the movable unit 30*a* (the imaging unit 39*a*), which should be moved to, is calculated on the basis of the first and second angular velocities vx and vy, in step S16.

In step S17, the driving force D, which drives the driver circuit 29 in order to move the movable unit 30*a* to the position S, in other words the first PWM duty dx and the second PWM duty dy, is calculated on the basis of the position S (sx, sy), which is determined in step S15 or step S16, and the present position P (pdx, pdy).

In step S18, the first and second horizontal driving coils 31*a* and 32*a* are driven by using the first PWM duty dx through the driver circuit 29, and the first and second vertical driving coils 33*a* and 34*a* are driven by using the second PWM duty dy through the driver circuit 29, so that the movable unit 30*a* is moved.

The process in steps S17 and S18 is an automatic control calculation, which is used with the PID automatic control for performing general (normal) proportional, integral, and differential calculations.

Next, the second embodiment is explained. In the second embodiment, the constructions of the hall-element signal-processing unit 45 are different from those of the first embodiment (see FIG. 17).

Therefore, the second embodiment is explained centering on the constructions of the photographing apparatus 1 in the second embodiment which are different to the constructions of the photographing apparatus 1 in the first embodiment.

The hall-element signal-processing unit 45 has first and second hall-element signal-processing circuits 450 and 460.

The first hall-element signal-processing circuit 450 detects a first horizontal potential-difference x1 between output terminals of the first horizontal hall element hh1, based on an output signal of the first horizontal hall element hh1, and detects a second horizontal potential-difference x2 between output terminals of the second horizontal hall element hh2, based on an output signal of the second horizontal hall element hh2.

The first hall-element signal-processing circuit 450 outputs the first detected-position signal px, which specifies the first location in the first direction x of the movable unit 30a, to the A/D converter A/D 2 of the CPU 21, on the basis of the first and second horizontal potential-differences x1 and x2.

The second hall-element signal-processing circuit 460 detects a first vertical potential-difference y1 between output terminals of the first vertical hall element hv1, based on an output signal of the first vertical hall element hv1, and detects a second vertical potential-difference y2 between output terminals of the second vertical hall element hv2, based on an output signal of the second vertical hall element hv2.

The second hall-element signal-processing circuit 460 outputs the second detected-position signal py, which specifies the second location in the second direction y of the movable unit 30a, to the A/D converter A/D 3 of the CPU 21, on the basis of the first and second vertical potential-differences y1 and y2.

Figure 17:
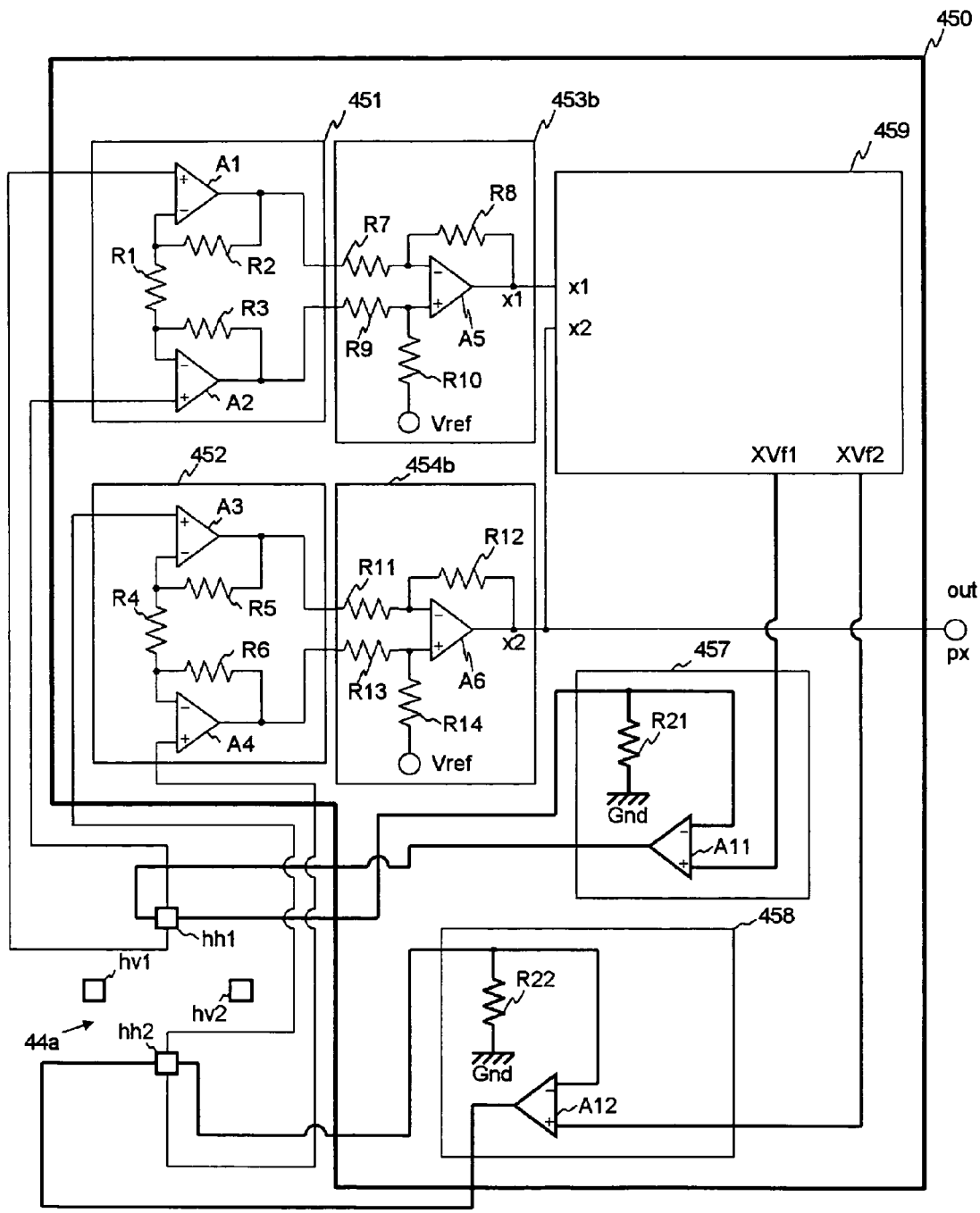
FIG. 17 is a circuit construction diagram of the hall element unit and the first hall-element signal-processing circuit in the second embodiment.
Figure 18:
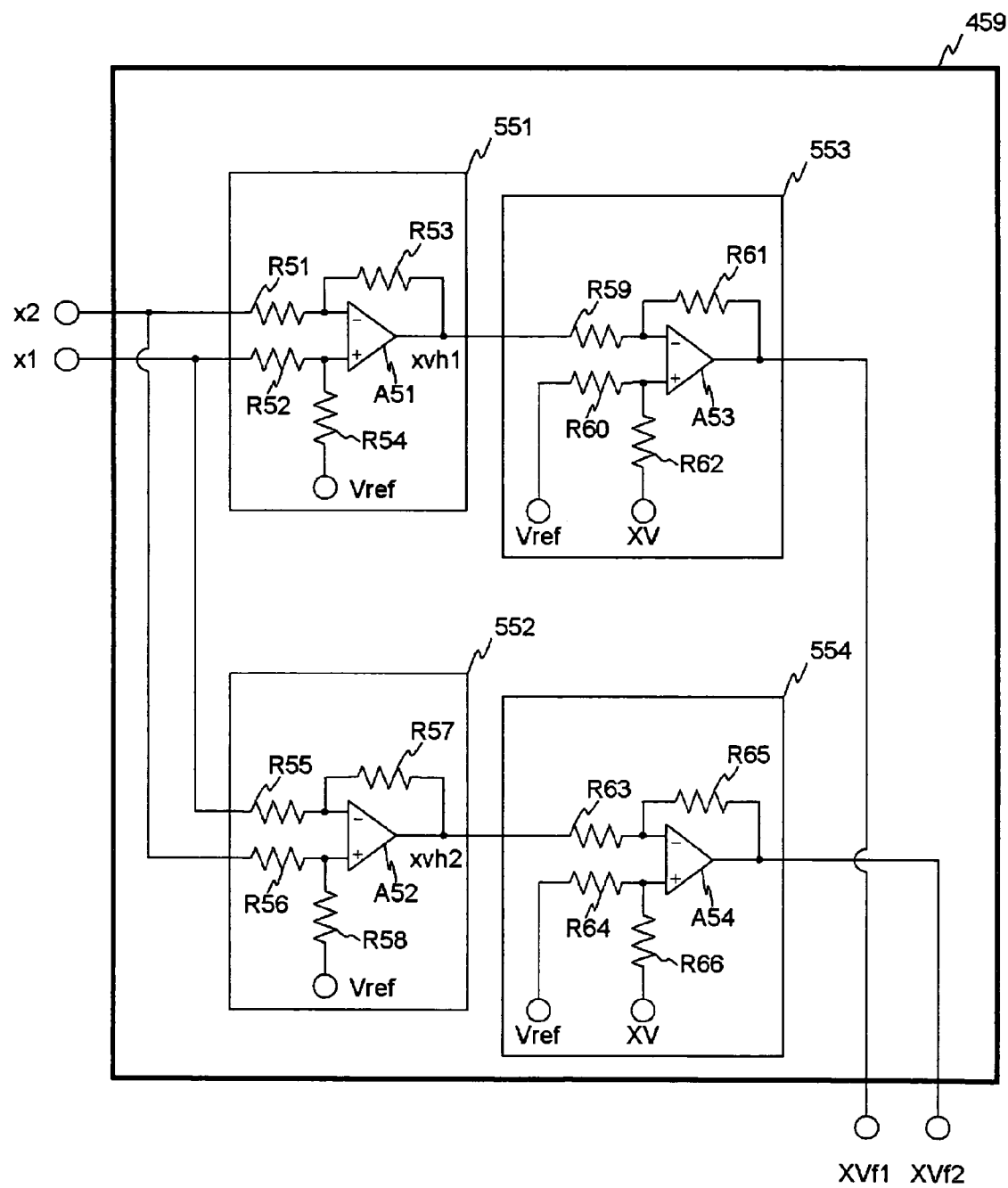
FIG. 18 is a circuit construction diagram of the horizontal power control circuit in the second embodiment.

The circuit construction regarding input/output signals of the first and second horizontal hall elements hh1 and hh2, in the first hall-element signal-processing circuit 450 of the hall-element signal-processing unit 45, and the circuit construction regarding input/output signals of the first and second vertical hall elements hv1 and hv2, in the second hall-element signal-processing circuit 460 of the hall-element signal-processing unit 45 are explained using FIGS. 17 and 18. In FIGS. 17 and 18, the circuit construction of the second hall-element signal-processing circuit 460 (regarding input/output signals of the first and second vertical hall elements hv1 and hv2) is omitted (see FIGS. 19 and 20).

The first hall-element signal-processing circuit 450 has a first horizontal differential amplifier circuit 451, a second horizontal differential amplifier circuit 452, a first horizontal subtracting amplifier circuit 453b, a second horizontal subtracting amplifier circuit 454b, for controlling the outputs of the first and second horizontal hall elements hh1 and hh2 (as an output unit), and has a first horizontal power circuit 457, a second horizontal power circuit 458, and a horizontal power control circuit 459 for performing feed-back from the outputs to the inputs of the first and second horizontal hall elements hh1 and hh2 (as a feed-back unit).

Both output terminals of the first horizontal hall element hh1 are connected with the first horizontal differential amplifier circuit 451, so that the first horizontal differential amplifier circuit 451 is connected with the first horizontal subtracting amplifier circuit 453b.

The first horizontal differential amplifier circuit 451 is a differential amplifier which amplifies the signal difference between the output terminals of the first horizontal hall element hh1.

The first horizontal subtracting amplifier circuit 453b is a subtracting amplifier circuit which calculates the first horizontal potential-difference x1 (the hall output voltage) which is a multiple of a predetermined amplification rate and the difference between the amplified signal difference from the first horizontal differential amplifier circuit 451 and a reference voltage Vref.

Both output terminals of the second horizontal hall element hh2 are connected with the second horizontal differential amplifier circuit 452, so that the second horizontal differential amplifier circuit 452 is connected with the second horizontal subtracting amplifier circuit 454b.

The second horizontal differential amplifier circuit 452 is a differential amplifier which amplifies the signal difference between the output terminals of the second horizontal hall element hh2.

The second horizontal subtracting amplifier circuit 454b is a subtracting amplifier circuit which calculates the second horizontal potential-difference x2 (the hall output voltage) which is a multiple of the predetermined amplification rate and the difference between the amplified signal difference from the second horizontal differential amplifier circuit 452 and a reference voltage Vref.

The first and second horizontal subtracting amplifier circuits 453b and 454b are connected with the horizontal power control circuit 459. The horizontal power control circuit 459 is connected with the first and second horizontal power circuits 457 and 458. The second horizontal subtracting amplifier circuit 454b is connected with the CPU 21. The second horizontal potential-difference x2 is output to the A/D converter A/D 2 of the CPU 21 as the first detected-position signal px.

The horizontal power control circuit 459 calculates the values of the first horizontal voltage XVf1 and the second horizontal voltage XVf2 on the basis of the first and second horizontal potential-differences x1 and x2. The first horizontal voltage XVf1 is input to the non-inverting input terminal of the first horizontal power circuit 457, and is applied to the input terminals of the first horizontal hall element hh1. The second horizontal voltage XVf2 is input to the non-inverting input terminal of the second horizontal power circuit 458, and is applied to the input terminals of the second horizontal hall element hh2. The application to the first horizontal hall element hh1 of the first horizontal voltage XVf1 and the application to the second horizontal hall element hh2 of the second horizontal voltage XVf2 make the values of the first and second horizontal potential-differences x1 and x2 agree.

The first horizontal differential amplifier circuit 451 has a resistor R1, a resistor R2, a resistor R3, an operational amplifier A1, and an operational amplifier A2. The operational amplifier A1 has an inverting input terminal, a non-inverting input terminal, and an output terminal. The operational amplifier A2 has an inverting input terminal, a non-inverting input terminal, and an output terminal.

One of the output terminals of the first horizontal hall element hh1 is connected with the non-inverting input terminal of the operational amplifier A1, so that the other terminal of the first horizontal hall element hh1 is connected with the non-inverting input terminal of the operational amplifier A2.

The inverting input terminal of the operational amplifier A1 is connected with the resistors R1 and R2, so that the inverting input terminal of the operational amplifier A2 is connected with the resistors R1 and R3.

The output terminal of the operational amplifier A1 is connected with the resistor R2 and the resistor R7 in the first horizontal subtracting amplifier circuit 453b. The output terminal of the operational amplifier A2 is connected with the resistor R3 and the resistor R9 in the first horizontal subtracting amplifier circuit 453b.

The second horizontal differential amplifier circuit 452 has a resistor R4, a resistor R5, a resistor R6, an operational amplifier A3, and an operational amplifier A4. The operational amplifier A3 has an inverting input terminal, a non-inverting input terminal, and an output terminal. The operational amplifier A4 has an inverting input terminal, a non-inverting input terminal, and an output terminal.

One of the output terminals of the second horizontal hall element hh2 is connected with the non-inverting input terminal of the operational amplifier A3, so that the other terminal of the second horizontal hall element hh2 is connected with the non-inverting input terminal of the operational amplifier A4.

The inverting input terminal of the operational amplifier A3 is connected with the resistors R4 and R5, so that the inverting input terminal of the operational amplifier A4 is connected with the resistors R4 and R6.

The output terminal of the operational amplifier A3 is connected with the resistor R5 and the resistor R11 in the second horizontal subtracting amplifier circuit 454$b$. The output terminal of the operational amplifier A4 is connected with the resistor R6 and the resistor R13 in the second horizontal subtracting amplifier circuit 454$b$.

The first horizontal subtracting amplifier circuit 453$b$ has a resistor R7, a resistor R8, a resistor R9, a resistor R10, and an operational amplifier A5. The operational amplifier A5 has an inverting input terminal, a non-inverting input terminal, and an output terminal. The inverting input terminal of the operational amplifier A5 is connected with the resistors R7 and R8. The non-inverting input terminal of the operational amplifier A5 is connected with the resistors R9 and R10. The output terminal of the operational amplifier A5 is connected with the resistor R8, the resistor R52 of the first circuit 551 of the horizontal power control circuit 459, and the resistor R55 of the second circuit 552 of the horizontal power control circuit 459. The first horizontal potential-difference x1 is output from the output terminal of the operational amplifier A5. One of the terminals of the resistor R10 is connected with the power supply whose voltage is the reference voltage Vref.

The second horizontal subtracting amplifier circuit 454$b$ has a resistor R11, a resistor R12, a resistor R13, a resistor R14, and an operational amplifier A6. The operational amplifier A6 has an inverting input terminal, a non-inverting input terminal, and an output terminal. The inverting input terminal of the operational amplifier A6 is connected with the resistors R11 and R12. The non-inverting input terminal of the operational amplifier A6 is connected with the resistors R13 and R14. The output terminal of the operational amplifier A6 is connected with the resistor R12, the resistor R51 of the first circuit 551 of the horizontal power control circuit 459, and the resistor R56 of the second circuit 552 of the horizontal power control circuit 459. The second horizontal potential-difference x2 is output from the output terminal of the operational amplifier A6. One of the terminals of the resistor R14 is connected with the power supply whose voltage is the reference voltage Vref.

In the second embodiment, the output terminal of the operational amplifier A6 is connected with the A/D converter A/D 2 of the CPU 21. However, the output terminal of the operational amplifier A5 may be connected with the A/D converter A/D 2 of the CPU 21 instead of the operational amplifier A6. This is because the first horizontal potential-difference x1 agrees with the second horizontal potential-difference x2 in the horizontal power control circuit 459.

The values of the resistors R1 and R4 are the same. The values of the resistors R2, R3, R5 and R6 are the same. The values of the resistors R7, R9, R11, and R13 are the same. The values of the resistors R8, R10, R12, and R14 are the same.

The operational amplifiers A1, A2, A3 and A4 are the same type of amplifier. The operational amplifiers A5 and A6 are the same type of amplifier.

The horizontal power control circuit 459 has first, second, third, and fourth circuits 551, 552, 553, and 554. The first circuit 551 is connected with the third circuit 553. The second circuit 552 is connected with the fourth circuit 554. The third circuit 553 is connected with the first horizontal power circuit 457. The fourth circuit 554 is connected with the second horizontal power circuit 458.

The first circuit 551 is a subtracting amplifier circuit which multiplies a first amplification rate AA1 (=½) by the difference between the first and second horizontal potential-differences x1 and x2, and outputs a first horizontal intermediate voltage xvh1 which is equal to (x1−x2)/2 from the multiplied value by the first circuit 551.

The second circuit 552 is a subtracting amplifier circuit which multiplies the first amplification rate AA1 by the difference between the second and first horizontal potential-differences x1 and x2, and outputs a second horizontal intermediate voltage xvh2 which is equal to (x2−x1)/2 from the multiplied value by the second circuit 552.

The third circuit 553 is a subtracting amplifier circuit which multiplies a second amplification rate AA2 by the difference between the reference voltage Vref and the first horizontal intermediate voltage xvh1, and calculates the difference between a horizontal reference voltage XV and the multiplied value by the third circuit 553, and outputs the first horizontal voltage XVf1 which is equal to XV−AA2×(Vref−xvh1).

The fourth circuit 554 is a subtracting amplifier circuit which multiplies the second amplification rate AA2 by the difference between the reference voltage Vref and the second horizontal intermediate voltage xvh2, and calculates the difference between the horizontal reference voltage XV and the multiplied value by the fourth circuit 554, and outputs the second horizontal voltage XVf2 which is equal to XV−AA2×(Vref−xvh2).

The first circuit 551 has a resistor R51, a resistor R52, a resistor R53, a resistor R54, and an operational amplifier A51. The operational amplifier A51 has an inverting input terminal, a non-inverting input terminal, and an output terminal. The inverting input terminal of the operational amplifier A51 is connected with the resistor R51 and the resistor R53. The non-inverting input terminal of the operational amplifier A51 is connected with the resistor R52 and the resistor R54. The output terminal of the operational amplifier A51 is connected with the resistor R53 and the resistor R59 of the third circuit 553. The first horizontal intermediate voltage xvh1 is output from the output terminal of the operational amplifier A51. One of the terminals of the resistor R54 is connected with the power supply whose voltage is the reference voltage Vref.

The second circuit 552 has a resistor R55, a resistor R56, a resistor R57, a resistor R58, and an operational amplifier A52. The operational amplifier A52 has an inverting input terminal, a non-inverting input terminal, and an output terminal. The inverting input terminal of the operational amplifier A52 is connected with the resistor R55 and the resistor R57. The non-inverting input terminal of the operational amplifier A52 is connected with the resistor R56 and the resistor R58. The output terminal of the operational amplifier A52 is connected with the resistor R57 and the resistor R63 of the fourth circuit 554. The second horizontal intermediate voltage xvh2 is output from the output terminal of the operational amplifier A52. One of the terminals of the resistor R58 is connected with the power supply whose voltage is the reference voltage Vref.

The values of the resistors R51, R52, R55 and R56 are the same. The values of the resistors R53, R54, R57 and R58 are the same. The value of the resistor R53 is the half of the value of the resistor R51.

The operational amplifiers A51 and A52 are the same type of amplifier.

The value of the first amplification rate AA1 is ½. The value of the first horizontal intermediate voltage xvh1 is (x1−x2)/2 which is the first amplification rate AA1 (=½) multiplied by the difference between the first and second horizontal potential-differences x1 and x2. The value of the second horizontal intermediate voltage xvh2 is (x2−x1)/2 which is the first amplification rate AA1 (=½) multiplied by the difference between the second and first horizontal potential-differences x2 and x1.

The third circuit 553 has a resistor R59, a resistor R60, a resistor R61, a resistor R62, and an operational amplifier A53. The operational amplifier A53 has an inverting input terminal, a non-inverting input terminal, and an output terminal. The inverting input terminal of the operational amplifier A53 is connected with the resistor R59 and the resistor R61. The non-inverting input terminal of the operational amplifier A53 is connected with the resistor R60 and the resistor R62. The output terminal of the operational amplifier A53 is connected with the resistor R61 and the non-inverting input terminal of the operational amplifier A11 of the first horizontal power circuit 457. The first horizontal voltage XVf1 is output from the output terminal of the operational amplifier A53. One of the terminals of the resistor R60 is connected with the power supply whose voltage is the reference voltage Vref. One of the terminals of the resistor R62 is connected with the power supply whose voltage is the horizontal reference voltage XV.

The fourth circuit 554 has a resistor R63, a resistor R64, a resistor R65, a resistor R66, and an operational amplifier A54. The operational amplifier A54 has an inverting input terminal, a non-inverting input terminal, and an output terminal. The inverting input terminal of the operational amplifier A54 is connected with the resistor R63 and the resistor R65. The non-inverting input terminal of the operational amplifier A54 is connected with the resistor R64 and the resistor R66. The output terminal of the operational amplifier A54 is connected with the resistor R65 and the non-inverting input terminal of the operational amplifier A12 of the second horizontal power circuit 458. The second horizontal voltage XVf2 is output from the output terminal of the operational amplifier A54. One of the terminals of the resistor R64 is connected with the power supply whose voltage is the reference voltage Vref. One of the terminals of the resistor R66 is connected with the power supply whose voltage is the horizontal reference voltage XV.

The values of the resistors R59, R60, R63 and R64 are the same. The values of the resistors R61, R62, R65 and R66 are the same.

The operational amplifiers A53 and A54 are the same type of amplifier.

The second amplification rate AA2 is the value of the resistor R61 divided by the value of the resistor R59 (AA2=R61/R59)

The value of the first horizontal voltage XVf1 is XV−(Vref−xvh1)×R61/R59 which is a difference between the horizontal reference XV, and the second amplification rate AA2 multiplied by the difference between the reference voltage Vref and the first horizontal intermediate voltage xvh1.

The value of the second horizontal voltage XVh2 is XV−(Vref−xvh2)×R61/R59, (R61/R59=R65/R63), which is a difference between the horizontal reference XV, and the second amplification rate AA2 multiplied by the difference between the reference voltage Vref and the second horizontal intermediate voltage xvh2.

The first horizontal power circuit 457 has a resistor R21 and an operational amplifier A11. The operational amplifier A11 has an inverting input terminal, a non-inverting input terminal, and an output terminal. The inverting input terminal of the operational amplifier A11 is connected with the resistor R21 and one of the input terminals of the first horizontal hall element hh1. The potential of the non-inverting input terminal of the operational amplifier A11 is set at the first horizontal voltage XVf1. The output terminal of the operational amplifier A11 is connected with the other input terminal of the first horizontal hall element hh1. One of the terminals of the resistor R21 is grounded.

The second horizontal power circuit 458 has a resistor R22 and an operational amplifier A12. The operational amplifier A12 has an inverting input terminal, a non-inverting input terminal, and an output terminal. The inverting input terminal of the operational amplifier A12 is connected with the resistor R22 and one of the input terminals of the second horizontal hall element hh2. The potential of the non-inverting input terminal of the operational amplifier A12 is set at the second horizontal voltage XVf2. The output terminal of the operational amplifier A12 is connected with the other input terminal of the second horizontal hall element hh2. One of the terminals of the resistor R22 is grounded.

The values of the first horizontal voltage XVf1 and the second horizontal voltage XVf2 change corresponding to the change of the values of the first horizontal potential-difference x1 and the second horizontal potential-difference x2.

The first horizontal potential-difference x1 changes corresponding to the change of the value of the magnetic-flux density between the first horizontal hall element hh1 and the first horizontal position-detecting and driving magnet 401*b*, and the change of the value of the voltage which is applied to the input terminals of the first horizontal hall element hh1.

The second horizontal potential-difference x2 changes corresponding to the change of the value of the magnetic-flux density between the second horizontal hall element hh2 and the second horizontal position-detecting and driving magnet 402*b*, and the change of the value of the voltage which is applied to the input terminals of the second horizontal hall element hh2.

Figure 19:
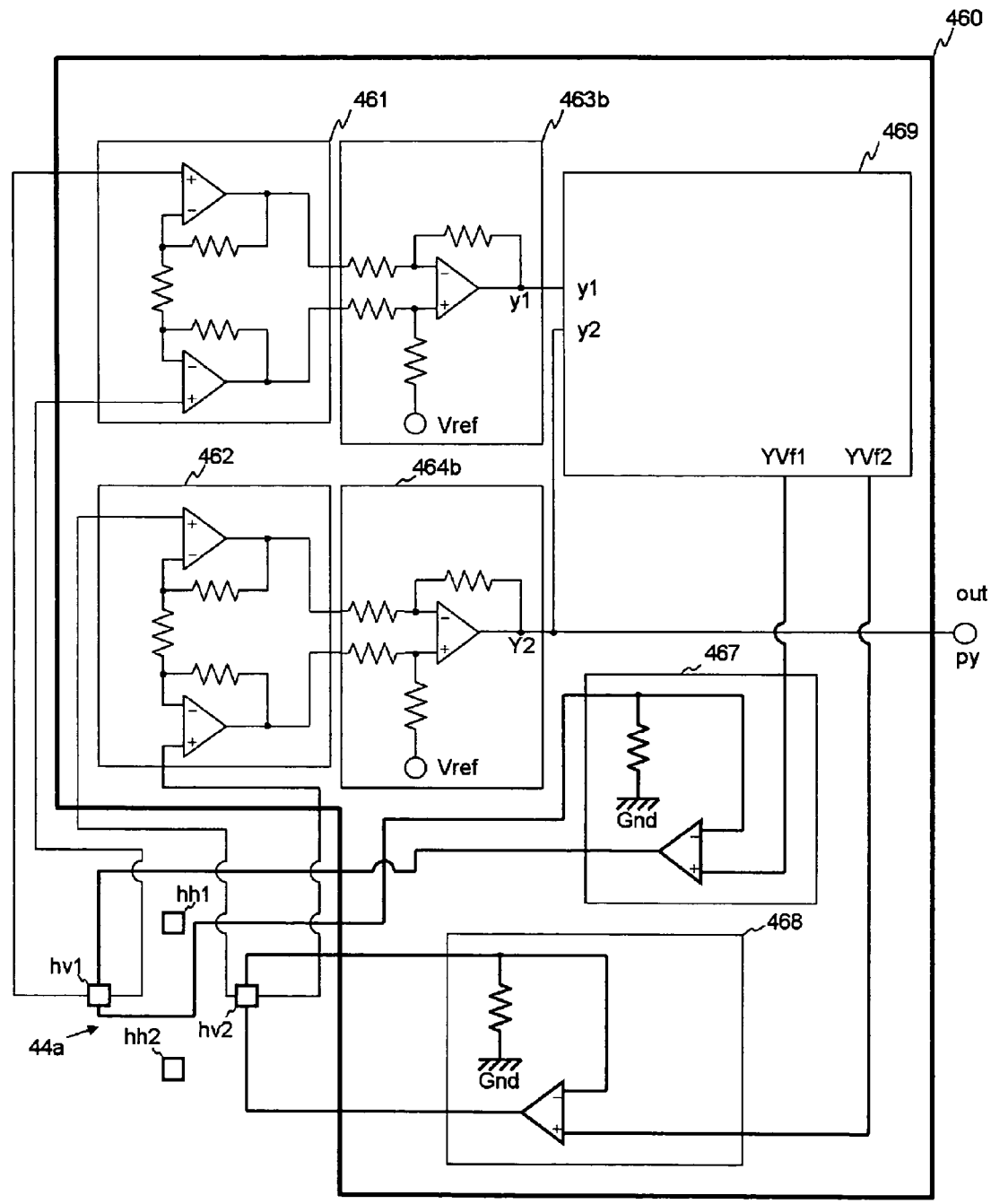
FIG. 19 is a circuit construction diagram of the hall element unit and the second hall-element signal-processing circuit in the second embodiment.
Figure 20:
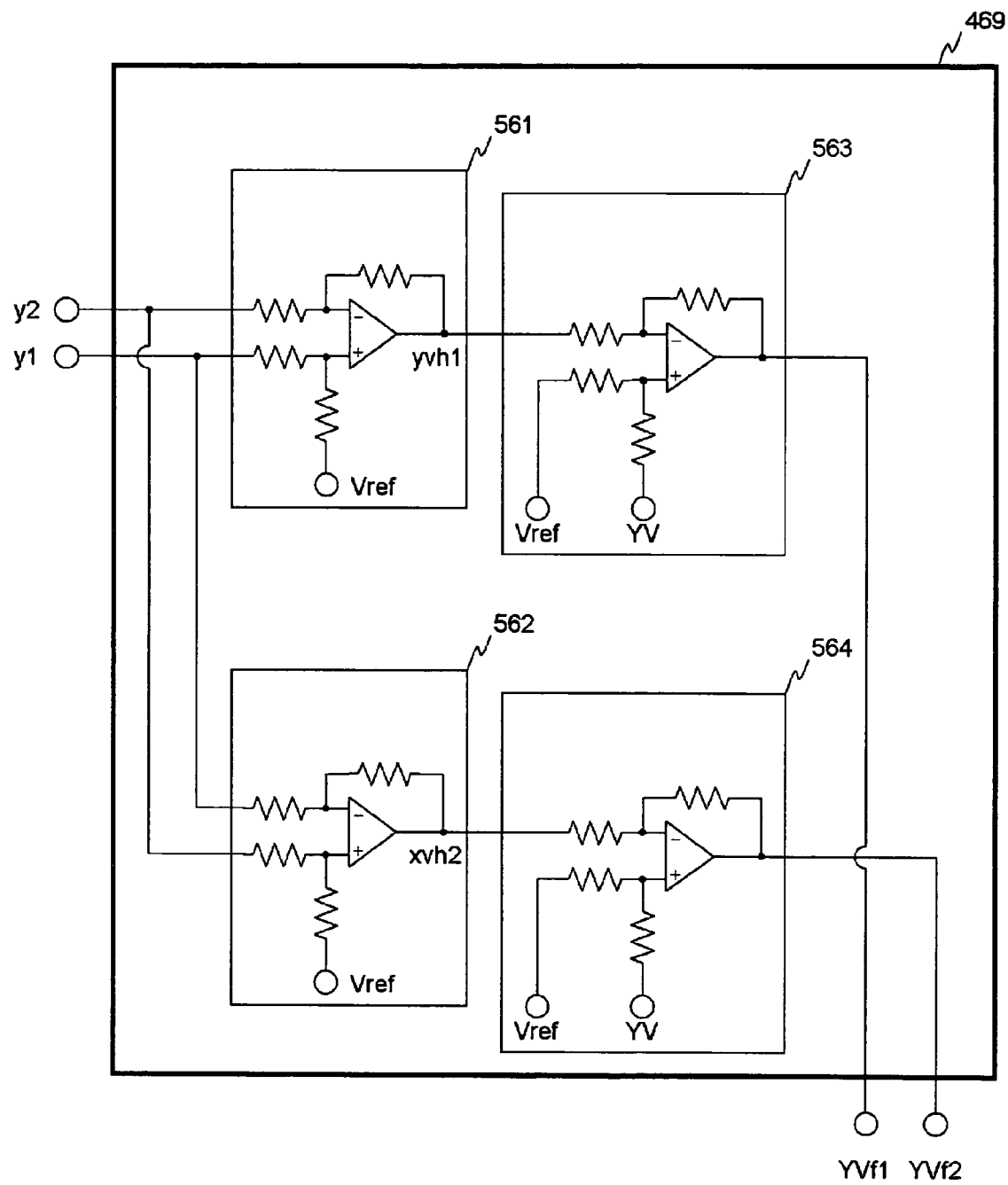
FIG. 20 is a circuit construction diagram of the vertical power control circuit in the second embodiment.

The circuit construction regarding input/output signals of the first and second vertical hall elements hv1 and hv2, in the second hall-element signal-processing circuit 460 of the hall-element signal-processing unit 45, is similar to the circuit construction regarding input/output signals of the first and second horizontal hall elements hh1 and hh2, in the first hall-element signal-processing circuit 450 of the hall-element signal-processing unit 45 (see FIGS. 19 and 20). In FIGS. 19 and 20, the circuit construction of the first hall-element signal-processing circuit 450 (regarding input/output signals of the first and second horizontal hall elements hh1 and hh2) is omitted (see FIGS. 17 and 18).

The second hall-element signal-processing circuit 460 has a first vertical differential amplifier circuit 461 which is equivalent to the first horizontal differential amplifier circuit 451, a second vertical differential amplifier circuit 462 which is equivalent to the second horizontal differential amplifier circuit 452, a first vertical subtracting amplifier circuit 463*b* which is equivalent to the first horizontal subtracting amplifier circuit 453*b*, and a second vertical subtracting amplifier circuit 464*b* which is equivalent to the second horizontal subtracting amplifier circuit 454*b*, for controlling the outputs of the first and second vertical hall elements hv1 and hv2 (as an output unit)(see FIG. 19).

The first vertical potential-difference y1 which is equivalent to the first horizontal potential-difference x1 is output from the first vertical subtracting amplifier circuit 463*b*. The second vertical potential-difference y2 which is equivalent to the second horizontal potential-difference x2 is output from the second vertical subtracting amplifier circuit 464b, as the second detected-position signal py which is equivalent to the first detected-position signal px.

The second hall-element signal-processing circuit 460 has a first vertical power circuit 467 which is equivalent to the first horizontal power circuit 457, a second vertical power circuit 468 which is equivalent to the second horizontal power circuit 458, and a vertical power control circuit 469 which is equivalent to the horizontal power control circuit 459, for performing feed-back from the outputs to the inputs of the first and second vertical hall elements hv1 and hv2 (as a feed-back unit).

The vertical power control circuit 469 has a fifth circuit 561 which is equivalent to the first circuit 551, a sixth circuit 562 which is equivalent to the second circuit 552, a seventh circuit 563 which is equivalent to the third circuit 553, and a eighth circuit 564 which is equivalent to the fourth circuit 554.

The first vertical intermediate voltage yvh1 which is equivalent to the first horizontal intermediate voltage xvh1, is output from the fifth circuit 561.

The second vertical intermediate voltage yvh2 which is equivalent to the second horizontal intermediate voltage xvh2, is output from the sixth circuit 562.

The seventh circuit 563 is a subtracting amplifier circuit which multiplies the second amplification rate AA2 by the difference between the reference voltage Vref and the first vertical intermediate voltage yvh1, and calculates the difference between a vertical reference voltage YV (which is equivalent to the horizontal reference voltage XV) and the value obtained by the above multiplication, and then outputs the first vertical voltage Yvf1. That is, Yvf1 is equal to YV−AA2×(Vref−yvh1) and is equivalent to the first horizontal voltage XVf1.

The eighth circuit 564 is a subtracting amplifier circuit which multiplies the second amplification rate AA2 by the difference between the reference voltage Vref and the second vertical intermediate voltage yvh2, and calculates the difference between the vertical reference voltage YV and the value obtained by the above multiplication, and outputs the second vertical voltage YVf2. That is, YVf2 is equal to YV−AA2×(Vref−yvh2) and is equivalent to the second horizontal voltage XVf2.

The other constructions in the second embodiment are the same as those in the first embodiment.

In the second embodiment, when the movable unit 30a is moved in the second direction y, the values of the first distance d1 and the second distance d2 change.

Similarly, when the movable unit 30a is moved in the first direction x, the values of the third distance d3 and the fourth distance d4 change.

When the distance between the hall element and the magnet changes, the magnetic-flux density between the hall element and the magnet changes, so that value of the output signal from the hall element changes.

In the second embodiment, the voltage which is applied to each hall element is changed. The difference in the values of the first and second horizontal potential-differences x1 and x2 which occurs due to movement of the movable unit 30a in the second direction y, is cancelled, and the difference in the values of the first and second vertical potential-differences y1 and y2 which occurs due to movement of the movable unit 30a in the first direction x, is cancelled, where the change in the magnetic-flux density is compensated.

FIG. 9 shows a first location relation of the first and second horizontal position-detecting and driving magnets 401b and 402b and the first and second horizontal hall elements hh1 and hh2, when the movable unit 30a is at the center of its movement range in the second direction y. In FIG. 9, the first movable circuit board 49a1 etc., is omitted for simplicity.

FIG. 10 is a graph which shows a relationship between the first and second horizontal potential-differences x1 and x2 and the location of the movable unit 30a in the first direction x, when the movable unit 30a is in the center of its movement range in the second direction y.

In this case, because the first distance d1 and the second distance d2 are the same, the magnetic-flux density between the first horizontal position-detecting magnet 401b and the first horizontal hall element hh1, and the magnetic-flux density between the second horizontal position-detecting magnet 402b and the second horizontal hall element hh2 are the same. Accordingly, a first curve line (1) which shows the values of the first horizontal potential-difference x1, agrees with a second curve line (2) which shows the values of the second horizontal potential-difference x2. Therefore, a third curve line (3) which shows the second horizontal potential-difference x2 after the voltage control through the horizontal power control circuit 459, as the first detected-position signal px, agrees with the first curve line (1) and the second curve line (2).

FIG. 11 shows a second location relation of the first and second horizontal position-detecting and driving magnets 401b and 402b and the first and second horizontal hall elements hh1 and hh2, when the movable unit 30a is at the near side of the first horizontal position-detecting magnet 401b in comparison with the second horizontal position-detecting magnet 402b in the second direction y. In FIG. 11, the first movable circuit board 49a1 etc., is omitted for simplicity.

FIG. 12 is a graph which shows a relationship between the first and second horizontal potential-differences x1 and x2 and the location of the movable unit 30a in the first direction x, when the movable unit 30a is at the near side of the first horizontal position-detecting magnet 401b in comparison with the second horizontal position-detecting magnet 402b in the second direction y and when the voltage which is applied to the input terminals of the first and second horizontal hall elements hh1 and hh2 is equal to the horizontal reference voltage XV (before the voltage control through the horizontal power control circuit 459).

In this case, because the first distance d1 is shorter than the second distance d2, the magnetic-flux density between the first horizontal position-detecting magnet 401b and the first horizontal hall element hh1, is larger than the magnetic-flux density between the second horizontal position-detecting magnet 402b and the second horizontal hall element hh2. Accordingly, an output range of a fourth curve line (4) which shows the values of the first horizontal potential-difference x1, is wider than an output range of a fifth curve line (5) which shows the values of the second horizontal potential-difference x2.

In the second embodiment, the horizontal power control circuit 459 performs a calculation for the horizontal reference voltage XV considering the change of the first and second distances d1 and d2, so that the voltage which is applied to the input terminals of the first and second horizontal hall elements hh1 and hh2 is adjusted. Accordingly, the first horizontal voltage XVf1 which is adjusted is applied to the input terminals of the first horizontal hall element hh1, and the second horizontal voltage XVf2 which is adjusted is applied to the input terminals of the second horizontal hall element hh2.

By the application of the first horizontal voltage XVf1, the output range of the first horizontal potential-difference x1 is narrowed in comparison with when the horizontal reference voltage XV is applied to the input terminals of the first horizontal hall element hh1.

By the application of the second horizontal voltage XVf2, the output range of the second horizontal potential-difference x2 is widened in comparison with when the horizontal reference voltage XV is applied to the input terminals of the second horizontal hall element hh2.

Therefore, the first horizontal potential-difference x1 which is narrowed, agrees with the second horizontal potential-difference x2 which is widened as the first detected-position signal px after the voltage control through the horizontal power control circuit 459. A sixth curve line (6) shows the second horizontal potential-difference x2 which is widened.

FIG. 13 shows a second location relation of the first and second horizontal position-detecting and driving magnets 401b and 402b and the first and second horizontal hall elements hh1 and hh2, when the movable unit 30a is at the near side of the second horizontal position-detecting magnet 402b in comparison with the first horizontal position-detecting magnet 401b in the second direction y. In FIG. 13, the first movable circuit board 49a1 etc., is omitted for simplicity.

FIG. 14 is a graph which shows a relationship between the first and second horizontal potential-differences x1 and x2 and the location of the movable unit 30a in the first direction x, when the movable unit 30a is at the near side of the second horizontal position-detecting magnet 402b in comparison with the first horizontal position-detecting magnet 401b in the second direction y and when the voltage which is applied to the input terminals of the first and second horizontal hall elements hh1 and hh2 is equal to the horizontal reference voltage XV (before the voltage control through the horizontal power control circuit 459).

In this case, because the first distance d1 is longer than the second distance d2, the magnetic-flux density between the first horizontal position-detecting magnet 401b and the first horizontal hall element hh1, is smaller than the magnetic-flux density between the second horizontal position-detecting magnet 402b and the second horizontal hall element hh2. Accordingly, an output range of a seventh curve line (7) which shows the values of the first horizontal potential-difference x1, is narrower than an output range of a eighth curve line (8) which shows the values of the second horizontal potential-difference x2.

In the second embodiment, the horizontal power control circuit 459 performs a calculation for the horizontal reference voltage XV considering the change of the first and second distances d1 and d2, so that the voltage which is applied to the input terminals of the first and second horizontal hall elements hh1 and hh2 is adjusted. Accordingly, the first horizontal voltage XVf1 which is adjusted is applied to the input terminals of the first horizontal hall element hh1, and the second horizontal voltage XVf2 which is adjusted is applied to the input terminals of the second horizontal hall element hh2.

By the application of the first horizontal voltage XVf1, the output range of the first horizontal potential-difference x1 is widened in comparison with when the horizontal reference voltage XV is applied to the input terminals of the first horizontal hall element hh1.

By the application of the second horizontal voltage XVf2, the output range of the second horizontal potential-difference x2 is narrowed in comparison with when the horizontal reference voltage XV is applied to the input terminals of the second horizontal hall element hh2.

Therefore, the first horizontal potential-difference x1 which is widened, agrees with the second horizontal potential-difference x2 which is narrowed as the first detected-position signal px after the voltage control through the horizontal power control circuit 459. A ninth curve line (9) shows the second horizontal potential-difference x2 which is narrowed.

In the second embodiment, the first horizontal voltage XVf1 which is a feed-back voltage from the horizontal power control circuit 459, is applied to the input terminals of the first horizontal hall element hh1, and the second horizontal voltage XVf2 which is a feed-back voltage from the horizontal power control circuit 459, is applied to the input terminals of the second horizontal hall element hh2. After that, the second horizontal potential-difference x2 (or the first horizontal potential-difference x1) which is adjusted and output, is defined as the first detected-position signal px. Therefore, an accurate position detecting operation in the first direction x can be performed considering the movement of the movable unit 30a in the second direction y.

In other words, even if the movable unit 30a is moved to any place in the second direction y, the voltage which is applied to the input terminals of the first and second horizontal hall elements hh1 and hh2 is controlled corresponding to the change of the values of the fist and second distances d1 and d2. Accordingly, the second potential-difference x2 which is adjusted has a third curve line (3) (or the sixth curve lie (6), or the ninth curve line (9)).

Similarly, the first vertical voltage YVf1 which is fed-back by the vertical power control circuit 469, is applied to the input terminals of the first vertical hall element hv1, and the second vertical voltage YVf2 which is fed-back by the vertical power control circuit 469, is applied to the input terminals of the second vertical hall element hv2. After that, the second vertical potential-difference y2 (or the first vertical potential-difference y1) which is adjusted and output, is defined as the second detected-position signal py. Therefore, an accurate position detecting operation in the second direction y can be performed considering the movement of the movable unit 30a in the first direction x.

In the first and second embodiments, the first horizontal position-detecting and driving magnet 401b is one body and the second horizontal position-detecting magnet 402b is one body in order to detect the first location in the first direction x of the movable unit 30a, and drive the movable unit 30a in the first direction x. However a magnet for detecting the first location and a magnet for driving the movable unit 30a in the first direction x, may be separated.

Similarly, the first vertical position-detecting and driving magnet 411b is one body and the second vertical position-detecting and driving magnet 412b is one body in order to detect the second location in the second direction y of the movable unit 30a, and drive the movable unit 30a in the second direction y. However a magnet for detecting the second location and a magnet for driving the movable unit 30a in the second direction y, may be separated.

Further, it is explained that the hall element unit 44a is attached to the movable unit 30a and the position-detecting magnets (the first and second horizontal position-detecting and driving magnets 401b and 402b and the first and second vertical position-detecting and driving magnets 411b and 412b) are attached to the fixed unit 30b, however the hall element unit may be attached to the fixed unit and position-detecting magnets may be attached to the movable unit.

The magnet which generates a magnetic-field, may be a permanent magnet which always generates the magnetic-field, or an electric magnet which generates the magnetic-field when it is needed.

Further, it is explained that the movable unit 30a has the imaging device 39a1. However, the movable unit 30a may have a hand-shake correcting lens instead of the imaging device.

In the first embodiment, it is explained that the hall-element signal-processing unit 45 calculates the first and second detected-position signals px and py on the basis of the average value between the first and second horizontal potential-differences x1 and x2 and on the basis of the average value between the first and second vertical potential-differences y1 and y2. However, the calculation for the average value may be performed by the CPU 21. In this case, the hall-element signal-processing unit 45 outputs the first and second horizontal potential-differences x1 and x2 and the first and second vertical potential-differences y1 and y2 to the CPU 21, so that the CPU 21 calculates the average value between the first and second horizontal potential-differences x1 and x2 and the average value between the first and second vertical potential-differences y1 and y2, and specifies the first and second locations on the basis of these average values. The calculation of the average values may be performed before or after the A/D converting operation.

In the first and second embodiments, it is explained that the hall element is used for position-detecting as the magnetic-field change-detecting element, however, another detecting element may be used for position-detecting. Specifically, the detecting element may be an MI (Magnetic Impedance) sensor, in other words a high-frequency carrier-type magnetic-field sensor, or a magnetic resonance-type magnetic-field detecting element, or an MR (Magneto-Resistance effect) element. When one of the MI sensor, the magnetic resonance-type magnetic-field detecting element, and the MR element is used, the information regarding the position of the movable unit can be obtained by detecting the magnetic-field change, similar to using the hall element.

Further, in the first and second embodiments, the position detecting operation is performed by using the magnet and the magnetic-field change-detecting element, however, the position detecting operation may be performed by using another position-detecting element and member, such as an LED and a PSD (Position Sensitive Device).

Further, in the first and second embodiments, the movable unit 30a is movable in the first direction x and the second direction y, relative to the fixed unit 30b, so that the position-detecting operation is performed by detecting the position of the movable unit in the first direction x (the first location), and in the second direction y (the second location). However, any other methods (or means) for moving the movable unit 30a on a plane which is perpendicular to the third direction z (the optical axis LX), and for detecting the movable unit 30a on the plane, are acceptable.

For example, the movement of the movable unit may only be in one dimension, so that the movable unit can be moved only in the first direction x (not the second direction y). In this case, the parts regarding the movement of the movable unit in the second direction y and regarding the position-detecting operation of the movable unit in the second direction y, such as the first vertical hall element hv1 etc., may be omitted (see FIG. 3 etc.).

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 2004-161201 (filed on May 31, 2004) and 2004-161523 (filed on May 31, 2004) which are expressly incorporated herein by references, in their entirety.

The invention claimed is:

1. An anti-shake apparatus of a photographing apparatus, comprising:

a movable unit that supports one of an imaging device and a hand-shake correcting lens, and that is movable in first and second directions, said first direction being perpendicular to an optical axis of a photographing optical system of said photographing apparatus, and said second direction being perpendicular to said optical axis and to said first direction, and that performs an anti-shake operation by moving in said first and second directions;

a fixed unit that slidably supports said movable unit in both said first and second directions; and a calculation unit configured to calculate a first detected-position signal and a second detected-position signal;

one of said movable unit and said fixed unit having first and second position-detecting elements configured for detecting a position of said movable unit in said first direction as a first location, in order to calculate said first detected-position signal, and having third and fourth position-detecting elements configured for detecting a position of said movable unit in said second direction as a second location, in order to calculate said second detected-position signal;

another of said movable unit and said fixed unit having first and second members configured for detecting said first location, and having third and fourth members configured for detecting said second location;

said first position-detecting element facing said first member in said second direction;

said second position-detecting element facing said second member in said second direction;

said third position-detecting element facing said third member in said first direction;

said fourth position-detecting element facing said fourth member in said first direction;

said calculation unit configured to calculate said first detected-position signal being calculated on the basis of an average of output values of said first and second position-detecting elements and to calculate said second detected-position signal on the basis of an average of output values of said third and fourth position-detecting elements.

2. The anti-shake apparatus according to claim 1, wherein said first position-detecting element is a first magnetic-field change-detecting element;

said second position-detecting element is a second magnetic-field change-detecting element;

said third position-detecting element is a third magnetic-field change-detecting element;

said fourth position-detecting element is a fourth magnetic-field change-detecting element;

said first member is a first magnet;

said second member is a second magnet;

said third member is a third magnet; and said fourth member is a fourth magnet.

3. The anti-shake apparatus according to claim 2, wherein said movable unit has said first, second, third, and fourth magnetic-field change-detecting elements; and
   said fixed unit has said first, second, third, and fourth magnets.

4. The anti-shake apparatus according to claim 3, wherein when a center area of one of said imaging device and said hand-shake correcting lens which is included in said movable unit, passes through said optical axis, a positional relationship between said first and second magnetic-field change-detecting elements is set up so that a first distance between said first magnetic-field change-detecting element and said first magnet in said second direction, is the same as a second distance between said second magnetic-field change-detecting element and said second magnet in said second direction, and a positional relationship between said movable unit and said fixed unit is set up so that a distance between said first magnet and a center area of one of said imaging device and said hand-shake correcting lens which is included in said movable unit in said second direction, is the same as a distance between said second magnet and a center area of one of said imaging device and said hand-shake correcting lens which is included in said movable unit in said second direction.

5. The anti-shake apparatus according to claim 3, wherein when a center area of one of said imaging device and said hand-shake correcting lens which is included in said movable unit, passes through said optical axis, a positional relationship between said third and fourth magnetic-field change-detecting elements is set up so that a third distance between said third magnetic-field change-detecting element and said third magnet in said first direction, is the same as a fourth distance between said fourth magnetic-field change-detecting element and said fourth magnet in said first direction, and a positional relationship between said movable unit and said fixed unit is set up so that a distance between said third magnet and a center area of one of said imaging device and said hand-shake correcting lens which is included in said movable unit in said first direction, is the same as a distance between said fourth magnet and a center area of one of said imaging device and said hand-shake correcting lens which is included in said movable unit in said first direction.

6. The anti-shake apparatus according to claim 3, wherein said movable unit has a first coil configured for moving said movable unit in said first direction by a first electro-magnetic force, a second coil configured for moving said movable unit in said first direction by a second electro-magnetic force, a third coil configured for moving said movable unit in said second direction by a third electro-magnetic force, and a fourth coil configured for moving said movable unit in said first direction by a fourth electro-magnetic force;
   said first magnet faces said first coil and is configured for generating said first electro-magnetic force;
   said second magnet faces said second coil and is configured for generating said second electro-magnetic force;
   said third magnet faces said third coil and is configured for generating said third electro-magnetic force; and
   said fourth magnet faces said fourth coil and is configured for generating said fourth electro-magnetic force.

7. The anti-shake apparatus according to claim 6, wherein a coil pattern of said first coil has a line segment which is parallel to a third direction that is parallel to said optical axis, and which is configured for generating said first electro-magnetic force;
   a coil pattern of said second coil has a line segment which is parallel to said third direction, and which is configured for generating said second electro-magnetic force;
   a coil pattern of said third coil has a line segment which is parallel to said third direction, and which is configured for generating said third electro-magnetic force; and
   a coil pattern of said fourth coil has a line segment which is parallel to said third direction, and which is configured for generating said fourth electro-magnetic force.

8. The antis-shake apparatus according to claim 6, wherein said first magnetic-field change-detecting element is arranged inside the winding of said first coil;
   said second magnetic-field change-detecting element is arranged inside the winding of said second coil;
   said third magnetic-field change-detecting element is arranged inside the winding of said third coil; and
   said fourth magnetic-field change-detecting element is arranged inside the winding of said fourth coil.

9. The anti-shake apparatus according to claim 6, wherein said fixed unit has a first yoke which contacts said first magnet, and which comprises a magnetic material, and which forms a square-u-shape channel when viewed from said first direction, and has a second yoke which contacts said second magnet, and which comprises a magnetic material, and which forms a square-u-shape channel when viewed from said first direction, and has a third yoke which contacts said third magnet, and which comprises a magnetic material, and which forms a square-u-shape channel when viewed from said second direction, and has a fourth yoke which contacts said fourth magnet, and which comprises a magnetic material, and which forms a square-u-shape channel when viewed from said second direction;
   said first magnet, said first coil, and said first magnetic-field change-detecting element are inside the channel of said first yoke, in said second direction;
   said second magnet, said second coil, and said second magnetic-field change-detecting element are inside the channel of said second yoke, in said second direction;
   said third magnet, said third coil, and said third magnetic-field change-detecting element are inside the channel of said third yoke, in said first direction; and
   said fourth magnet, said fourth coil, and said fourth magnetic-field change-detecting element are inside the channel of said fourth yoke, in said first direction.

10. The anti-shake apparatus according to claim 2, wherein said calculation unit comprises:
   a first differential amplifier circuit that amplifies a signal difference between the output terminals of said first magnetic-field change-detecting element;
   a first subtracting circuit that calculates a first potential-difference on the basis of the difference between said amplified signal difference, from said first differential amplifier circuit, and a reference voltage;
   a second differential amplifier circuit that amplifies a signal difference between the output terminals of said second magnetic-field change-detecting element;
   a second subtracting circuit that calculates a second potential-difference on the basis of the difference between said amplified signal difference, from said second differential amplifier circuit, and said reference voltage;
   a third differential amplifier circuit that amplifies a signal difference between the output terminals of said third magnetic-field change-detecting element;
   a third subtracting circuit that calculates a third potential-difference on the basis of the difference between said amplified signal difference, from said third differential amplifier circuit, and said reference voltage;
   a fourth differential amplifier circuit that amplifies a signal difference between the output terminals of said fourth magnetic-field change-detecting element;

a fourth subtracting circuit that calculates a fourth potential-difference on the basis of the difference between said amplified signal difference, from said fourth differential amplifier circuit, and said reference voltage;

a first adder and inverting amplifier circuit that calculates said first detected-position signal by multiplying a predetermined amplification rate by an average of said first and second potential-differences; and a second adder and inverting amplifier circuit that calculates said second detected-position signal by multiplying a predetermined amplification rate by an average of said third and fourth potential-differences.

11. The anti-shake apparatus according to claim 2, wherein the N pole and S pole of said first magnet are arranged in said first direction;

the N pole and S pole of said second magnet are arranged in said first direction;

the N pole and S pole of said third magnet are arranged in said second direction; and the N pole and S pole of said fourth magnet are arranged in said second direction.

12. The anti-shake apparatus according to claim 11, wherein when the center of one of said imaging device and said hand-shake correcting lens which is included in said movable unit, passes through said optical axis, said first magnetic-field change-detecting element is located at a position that faces an intermediate area between said N pole and S pole of said first magnet in said first direction, and said second magnetic-field change-detecting element is located at a position that faces an intermediate area between said N pole and S pole of said second magnet in said first direction.

13. The anti-shake apparatus according to claim 11, wherein when the center of one of said imaging device and said hand-shake correcting lens which is included in said movable unit, passes through said optical axis, said third magnetic-field change-detecting element is located at a position that faces an intermediate area between said N pole and S pole of said third magnet in said second direction, and said fourth magnetic-field change-detecting element is located at a position that faces an intermediate area between said N pole and S pole of said fourth magnet in said second direction.

14. The anti-shake apparatus according to claim 2, wherein when the center area of one of said imaging device and said hand-shake correcting lens which is included in said movable unit, is located on said optical axis, said movable unit is located at the center of its movement range in both said first and second directions.

15. An anti-shake apparatus of a photographing apparatus, comprising:

a movable unit that supports one of an imaging device and a hand-shake correcting lens, and that is movable in a first direction, said first direction being perpendicular to an optical axis of a photographing optical system of said photographing apparatus, and that performs an anti-shake operation by moving in said first direction;

a fixed unit that slidably supports said movable unit in said first direction; and a calculation unit configured to calculate a detected-position signal;

one of said movable unit and said fixed unit having first and second position-detecting elements configured for detecting a position of said movable unit in said first direction as a first location, in order to calculate said detected-position signal;

another of said movable unit and said fixed unit having first and second members configured for detecting said first location;

said first position-detecting element facing said first member in a second direction which is perpendicular to said first direction and said optical axis;

said second position-detecting element facing said second member in said second direction; and said calculation unit configured to calculate said detected-position signal on the basis of an average of output values of said first and second position-detecting elements.

16. An anti-shake apparatus of a photographing apparatus, comprising:

a movable unit that has one of an imaging device and a hand-shake correcting lens, and that can be moved in first and second directions, said first direction being perpendicular to an optical axis of a photographing optical system of said photographing apparatus, and said second direction being perpendicular to said optical axis and said first direction, and that performs an anti-shake operation by moving in said first and second directions;

a fixed unit that slidably supports said movable unit in both said first and second directions; and a signal-processing unit that has an output unit and a feed-back unit;

one of said movable unit and said fixed unit having first and second position-detecting elements which are used for detecting a position of said movable unit in said first direction as a first location, and having third and fourth position-detecting elements which are used for detecting a position of said movable unit in said second direction as a second location;

another of said movable unit and said fixed unit having first and second members which are used for detecting said first location, and having third and fourth members which are used for detecting said second location;

said first position-detecting element facing said first member in said second direction;

said second position-detecting element facing said second member in said second direction;

said third position-detecting element facing said third member in said first direction;

said fourth position-detecting element facing said fourth member in said first direction;

said output unit calculating a first potential-difference between output terminals of said first position-detecting element, a second potential-difference between output terminals of said second position-detecting element, a third potential-difference between output terminals of said third position-detecting element, and a fourth potential-difference between output terminals of said fourth position-detecting element; and said feed-back unit calculating first and second voltages in order to make equal said first and second potential-differences, on the basis of said calculated first and second potential-differences, and applying said first voltage to the input terminals of said first position-detecting element, and applying said second voltage to the input terminals of said second position-detecting element, and calculating third and fourth voltages in order to make equal said third and fourth potential-differences, on the basis of said calculated third and fourth potential-differences, and applying said third voltage to the input terminals of said third position-detecting element, and applying said fourth voltage to the input terminals of said fourth position-detecting element.

17. The anti-shake apparatus according to claim 16, wherein said first position-detecting element is a first magnetic-field change-detecting element;

said second position-detecting element is a second magnetic-field change-detecting element;
said third position-detecting element is a third magnetic-field change-detecting element;
said fourth position-detecting element is a fourth magnetic-field change-detecting element;
said first member is a first magnet;
said second member is a second magnet;
said third member is a third magnet; and
said fourth member is a fourth magnet.

18. The anti-shake apparatus according to claim 17, wherein said movable unit has said first, second, third, and fourth magnetic-field change-detecting elements; and
said fixed unit has said first, second, third, and fourth magnets.

19. The anti-shake apparatus according to claim 18, wherein when a center area of one of said imaging device and said hand-shake correcting lens which is included in said movable unit, passes through said optical axis, a location relation between said first and second magnetic-field change-detecting elements is set up so that a first distance between said first magnetic-field change-detecting element and said first magnet, in said second direction, is the same as a second distance between said second magnetic-field change-detecting element and said second magnet, in said second direction, and a location relation between said movable unit and said fixed unit is set up so that a distance between said first magnet and a center area of one of said imaging device and said hand-shake correcting lens which is included in said movable unit, in said second direction, is the same as a distance between said second magnet and a center area of one of said imaging device and said hand-shake correcting lens which is included in said movable unit, in said second direction.

20. The anti-shake apparatus according to claim 18, wherein when a center area of one of said imaging device and said hand-shake correcting lens which is included in said movable unit, passes through said optical axis, a location relation between said third and fourth magnetic-field change-detecting elements is set up so that a third distance between said third magnetic-field change-detecting element and said third magnet, in said first direction, is the same as a fourth distance between said fourth magnetic-field change-detecting element and said fourth magnet, in said first direction, and a location relation between said movable unit and said fixed unit is set up so that a distance between said third magnet and a center area of one of said imaging device and said hand-shake correcting lens which is included in said movable unit, in said first direction, is the same as a distance between said fourth magnet and a center area of one of said imaging device and said hand-shake correcting lens which is included in said movable unit, in said first direction.

21. The anti-shake apparatus according to claim 18, wherein said movable unit has a first coil which is used for moving said movable unit in said first direction by a first electro-magnetic force, a second coil which is used for moving said movable unit in said first direction by a second electro-magnetic force, a third coil which is used for moving said movable unit in said second direction by a third electro-magnetic force, and a fourth coil which is used for moving said movable unit in said first direction by a fourth electro-magnetic force;
said first magnet faces said first coil and is used for generating said first electro-magnetic force;
said second magnet faces said second coil and is used for generating said second electro-magnetic force;
said third magnet faces said third coil and is used for generating said third electro-magnetic force; and
said fourth magnet faces said fourth coil and is used for generating said fourth electro-magnetic force.

22. The anti-shake apparatus according to claim 21, wherein a coil pattern of said first coil has a line segment which is parallel to a third direction being parallel to said optical axis, and which is used for generating said first electro-magnetic force;
a coil pattern of said second coil has a line segment which is parallel to said third direction, and which is used for generating said second electro-magnetic force;
a coil pattern of said third coil has a line segment which is parallel to said third direction, and which is used for generating said third electro-magnetic force; and
a coil pattern of said fourth coil has a line segment which is parallel to said third direction, and which is used for generating said fourth electro-magnetic force.

23. The anti-shake apparatus according to claim 21, wherein said first magnetic-field change-detecting element is arranged inside the winding of said first coil;
said second magnetic-field change-detecting element is arranged inside the winding of said second coil;
said third magnetic-field change-detecting element is arranged inside the winding of said third coil; and
said fourth magnetic-field change-detecting element is arranged inside the winding of said fourth coil.

24. The anti-shake apparatus according to claim 21, wherein said fixed unit has a first yoke which contacts said first magnet, and which is made of a magnetic material, and which forms a square-u-shape channel when viewed from said first direction, and has a second yoke which contacts said second magnet, and which is made of a magnetic material, and which forms a square-u-shape channel when viewed from said first direction, and has a third yoke which contacts said third magnet, and which is made of a magnetic material, and which forms a square-u-shape channel when viewed from said second direction, and has a fourth yoke which contacts said fourth magnet, and which is made of a magnetic material, and which forms a square-u-shape channel when viewed from said second direction;
said first magnet, said first coil, and said first magnetic-field change-detecting element are inside the channel of said first yoke, in said second direction;
said second magnet, said second coil, and said second magnetic-field change-detecting element are inside the channel of said second yoke, in said second direction;
said third magnet, said third coil, and said third magnetic-field change-detecting element are inside the channel of said third yoke, in said first direction; and
said fourth magnet, said fourth coil, and said fourth magnetic-field change-detecting element are inside the channel of said fourth yoke, in said first direction.

25. The anti-shake apparatus according to claim 17, wherein said output unit has a first differential amplifier circuit which amplifies a signal difference between the output terminals of said first magnetic-field change-detecting element, a second differential amplifier circuit which amplifies a signal difference between the output terminals of said second magnetic-field change-detecting element, a first subtracting circuit which calculates said first potential-difference on the basis of a difference between said amplified signal difference from said first differential amplifier circuit and a reference voltage, a second subtracting circuit which calculates said second potential-difference on the basis of a difference between said amplified signal difference from said second differential amplifier circuit and said reference voltage, a third differential amplifier circuit which amplifies a signal difference between the output terminals of said third magnetic-field change-detecting element, a fourth differential amplifier circuit which amplifies a signal difference between the output terminals of said fourth magnetic-field change-detecting element, a third subtracting circuit which calculates said third potential-difference on the basis of a difference between said amplified signal difference from said third differential amplifier circuit and said reference voltage, and a fourth subtracting circuit which calculates said fourth potential-difference on the basis of a difference between said amplified signal difference from said fourth differential amplifier circuit and said reference voltage.

26. The anti-shake apparatus according to claim 17, wherein said feed-back unit has first, second, third, fourth, fifth, sixth, seventh, and eighth circuits;

said first circuit multiplies a first amplification rate by a difference between said first and second potential-differences, and outputs a first intermediate voltage based on the multiplied value by said first circuit;

said second circuit multiplies said first amplification rate by a difference between said second and first potential-differences, and outputs a second intermediate voltage based on the multiplied value by said second circuit;

said third circuit multiplies a second amplification rate by a difference between said reference voltage and said first intermediate voltage, and calculates a difference between a horizontal reference voltage and the multiplied value by said third circuit, and outputs said first voltage;

said fourth circuit multiplies said second amplification rate by a difference between said reference voltage and said second intermediate voltage, and calculates a difference between said horizontal reference voltage and the multiplied value by said fourth circuit, and outputs said second voltage;

said fifth circuit multiplies said first amplification rate by a difference between said third and fourth potential-differences, and outputs a third intermediate voltage based on the multiplied value by said fifth circuit;

said sixth circuit multiplies said first amplification rate by a difference between said third and fourth potential-differences, and outputs a fourth intermediate voltage based on the multiplied value by said sixth circuit;

said seventh circuit multiplies said second amplification rate by a difference between said reference voltage and said third intermediate voltage, and calculates a difference between a vertical reference voltage and the multiplied value by said seventh circuit, and outputs said third voltage; and said eighth circuit multiplies said second amplification rate by a difference between said reference voltage and said fourth intermediate voltage, and calculates a difference between said vertical reference voltage and the multiplied value by said eighth circuit, and outputs said fourth voltage.

27. The anti-shake apparatus according to claim 26, wherein said first amplification rate is ½.

28. The anti-shake apparatus according to claim 17, wherein the N pole and S pole of said first magnet are arranged in said first direction;

the N pole and S pole of said second magnet are arranged in said first direction;

the N pole and S pole of said third magnet are arranged in said second direction; and the N pole and S pole of said fourth magnet are arranged in said second direction.

29. The anti-shake apparatus according to claim 28, wherein when the center of one of said imaging device and said hand-shake correcting lens which is included in said movable unit, passes through said optical axis, said first magnetic-field change-detecting element is located at a place which faces an intermediate area between said N pole and S pole of said first magnet in said first direction, and said second magnetic-field change-detecting element is located at a place which faces an intermediate area between said N pole and S pole of said second magnet in said first direction.

30. The anti-shake apparatus according to claim 28, wherein when the center of one of said imaging device and said hand-shake correcting lens which is included in said movable unit, passes through said optical axis, said third magnetic-field change-detecting element is located at a place which faces an intermediate area between said N pole and S pole of said third magnet in said second direction, and said fourth magnetic-field change-detecting element is located at a place which faces an intermediate area between said N pole and S pole of said fourth magnet in said second direction.

31. The anti-shake apparatus according to claim 17, wherein when the center area of one of said imaging device and said hand-shake correcting lens is located on said optical axis, said movable unit is located at the center of its movement range in both said first and second directions.

32. The anti-shake apparatus according to claim 17, wherein said output unit outputs the equal value of said first and second potential-differences as a result of the position-detecting operation of said movable unit in said first direction, and outputs the equal value of said third and fourth potential-differences as a result of the position-detecting operation of said movable unit in said second direction.

33. An anti-shake apparatus of a photographing apparatus, comprising:

a movable unit that has one of an imaging device and a hand-shake correcting lens, and that can be moved in a first direction, said first direction being perpendicular to an optical axis of a photographing optical system of said photographing apparatus, and that performs an anti-shake operation by moving in said first direction;

a fixed unit that slidably supports said movable unit in said first direction; and a signal-processing unit that has an output unit and a feed-back unit;

one of said movable unit and said fixed unit having first and second position-detecting elements which are used for detecting a position of said movable unit in said first direction as a first location;

another of said movable unit and said fixed unit having first and second members which are used for detecting said first location;

said first position-detecting element facing said first member in said second direction;

said second position-detecting element facing said second member in said second direction;

said output unit calculating a first potential-difference between output terminals of said first position-detecting element, and a second potential-difference between output terminals of said second position-detecting element; and said feed-back unit calculating first and second voltages in order to make equal said first and second potential-differences on the basis of said calculated first and second potential-differences, and applying said first voltage to the input terminals of said first position-detecting element, and applying said second voltage to the input terminals of said second position-detecting element.

* * * * *